United States Patent [19]

Hessbrüggen et al.

[11] Patent Number: 5,439,431
[45] Date of Patent: Aug. 8, 1995

[54] MACHINING CENTRE CONSTRUCTED FROM ASSEMBLIES

[75] Inventors: Norbert Hessbrüggen, Eschenbach; Heinz Steinbach, Ulm, both of Germany

[73] Assignee: EMAG-Maschinen Vertriebs - und Service GmbH, Salach, Germany

[21] Appl. No.: 43,796

[22] Filed: Apr. 7, 1993

[30] Foreign Application Priority Data

Apr. 10, 1992 [DE] Germany ............ 42 12 175.2
Mar. 14, 1993 [EP] European Pat. Off. ........... 93104144

[51] Int. Cl.⁶ ........................................... B23Q 3/157
[52] U.S. Cl. ............................ 483/14; 29/27 C; 29/DIG. 56; 74/608; 408/234; 409/134; 409/235; 483/18; 483/24; 483/56
[58] Field of Search ................. 483/14, 15, 36, 24, 483/27, 7, 8, 17, 56; 82/149; 29/27 R, 27 C, 50, DIG. 56, DIG. 86; 409/235, 134; 33/185 R; 408/234, 12; 318/574; 74/608; 248/679

[56] References Cited

U.S. PATENT DOCUMENTS

| | | | |
|---|---|---|---|
| 3,783,741 | 1/1974 | Schadebrodt et al. | 409/235 X |
| 4,118,871 | 10/1978 | Kirkham | 318/574 X |
| 4,151,642 | 5/1979 | Holland et al. | 483/8 |
| 4,404,727 | 9/1983 | Zankl | 483/14 |
| 4,510,668 | 4/1985 | Ishida et al. | 409/235 |
| 4,567,659 | 2/1986 | Kitamura | 483/8 X |
| 4,646,422 | 3/1987 | McMurtry | 483/14 X |
| 4,706,371 | 11/1987 | McMurtry | 483/17 |
| 4,706,373 | 11/1987 | Andriussi | 483/7 |
| 4,716,647 | 1/1988 | Winkler | 483/14 |
| 4,736,512 | 4/1988 | Gusching et al. | 403/14 |
| 4,742,609 | 5/1988 | Neumann | 408/234 X |
| 4,742,739 | 5/1988 | Yamaguchi et al. | 82/149 X |
| 4,826,127 | 5/1989 | Kobischek et al. | 248/679 |
| 4,951,376 | 8/1990 | Grund | 29/27 C |
| 5,117,552 | 6/1992 | Babel | 483/36 |
| 5,181,898 | 1/1993 | Piotrowski | 483/56 X |

FOREIGN PATENT DOCUMENTS

| | | | |
|---|---|---|---|
| 2723544 | 12/1978 | Germany | 483/13 |
| 3416660 | 9/1987 | Germany | 483/14 |
| 3721610 | 1/1989 | Germany | 483/14 |
| 3066552 | 3/1991 | Japan | 483/13 |

Primary Examiner—William Briggs
Attorney, Agent, or Firm—Antonelli, Terry, Stout & Kraus

[57] ABSTRACT

A machining center composed of a plurality of assemblies, with each assembly including a machine base. Each machine base includes a compound slide as well as guides for guiding a movement of the compound slide. A motor driven main spindle is adapted to be attached to the compound slide and is movable along a plurality of axes, with facilities being provided for collecting swarf and coolant. A working area housing is attached to the machine structure with the housing including a container adapted to be mounted on the machine structure as a module to house control elements and power supply. Openings are provided for enabling a collection and removal of swarf with additional openings being provided for enabling an accommodation of a storage and transportation unit. A probe is incorporated in a machine control for enabling a checking of machined workpieces, and a sheet metal cover, fastened to the compound slide, includes a hole penetrated by the motor spindle with a spindle attachment. The motor spindle penetrates the sheet metal cover in a sealed fashion.

54 Claims, 34 Drawing Sheets

Fig.2
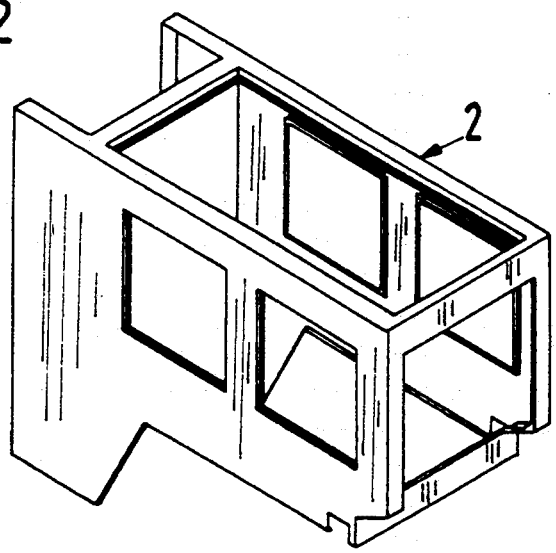
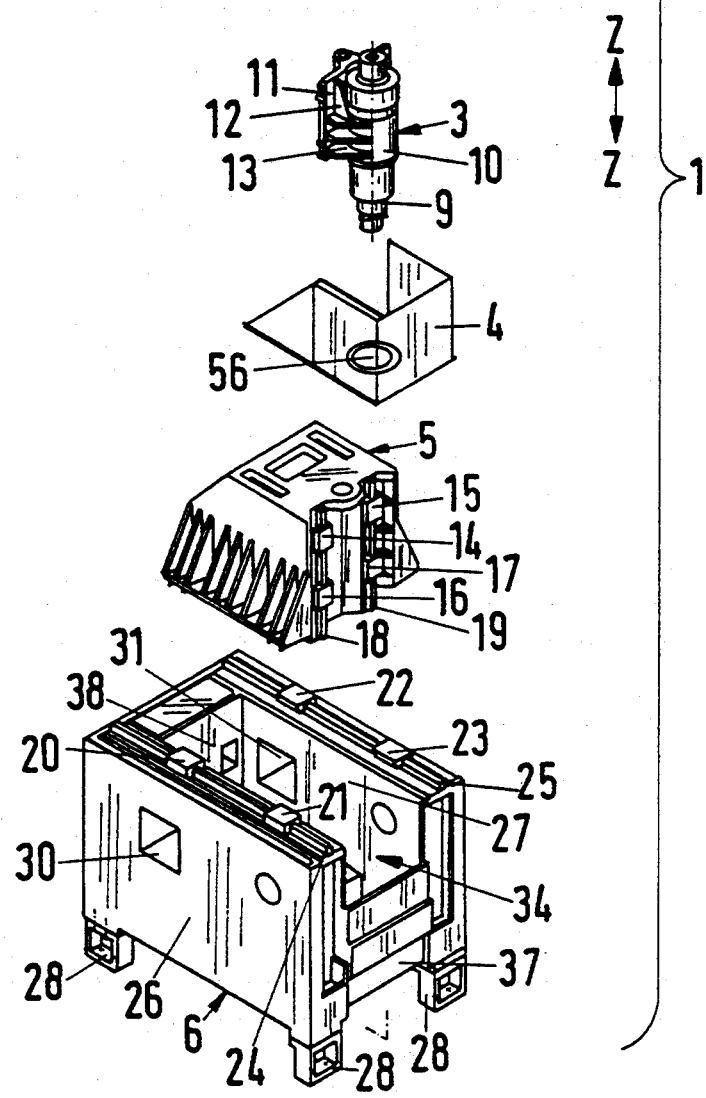

MACHINING CENTRE CONSTRUCTED FROM ASSEMBLIES

FIELD OF THE INVENTION

The present invention relates to a machining center constructed from modules, with the machine structure, on which by guides positioned above a compound slide, a motor driven main spindle is located that it adjustable over several axes, whereby devices are provided on the machine structure for a collection of swarf and coolant, and with a working area covering being allocated to the machine structure.

BACKGROUND OF THE INVENTION

A machining center of the aforementioned type is proposed in DE-OS 40 12 690, with the machining center including a bed supporting a workpiece table, a longitudinally traversable slide on the bed, a transverse traversable upright on the slide, a vertically transversable machining on the upright and a tool magazine with a changer, whereby the bed is an inclined bed sloping to the rear and downwards, and whereby the workpiece table is located at the front of the bed. Mounts are provided on the vertical front of the inclined bed for fastening a table console as well as at least one swarf shaft. The upright has two stiff columns, with inner vertical guides, rigidly linked by at least one transverse cross beam, on which the machining head is guided on both sides. Various types of machining heads can be fitted on the upright. A traversing swarf apron is located on a front of the upright, on which the swarf slips into the swarf shaft. The swarf apron is of a slotted design with its lower end fastened on the bed, whereby the machining head is laterally adjustable at its upper end. Various types of tool tables with their consoles can be fitted on the bed. In addition to the upright, the tool magazine with its tool changer is firmly located, whereby the tool changer is approached by a movement of the inclined slide.

DE-OS 38 24 602 proposes a machine for machining, with swarf removal, cubic and rotationally symmetrical workpieces or parts, whereby machining groups for the various operations such as drilling, milling and turning operations, are allocated to a machine base frame in a modular fashion, that is the respective individual machining assemblies can be respectively eliminated or added.

One turning unit is constructed as a workpiece clamping unit with a positionable axis that moves the workpiece to every required position by each of the machining units.

The workpiece clamping unit and the machining units are designed for five-sided machinery and associated with one another of a workpiece.

The turning unit is equipped with an automatic or manually operated workpiece clamping unit, whereby one main spindle of the turning unit enables its design as well as the feeds for operations such as milling and drilling operations, as well as higher speeds for other operations. One machining unit with two tool systems can also be present. The machining unit has adjustment possibilities in the X, Y and Z directions, as the first tool system a rotating work spindle accommodates drilling and milling tools and as the second tool system a multiple turret, primarily a conventional twelve or sixteen turret respectively accommodates stationary adjustable driven tools. A second main spindle may also be provided as a counter spindle to the first main spindle. Also available is a tool changer for the work spindle. In addition, the machining center can be provided with respective automatic programmable workpiece changing devices. A tool breakage control can also be present with the central swarf disposal.

DE-PS 34 16 660 proposes a lathe with a vertical work spindle located in a headstock, with a drive motor attached on the headstock, and with a workpiece chuck located on a lower end of the work spindle and with a tool carrier located beneath the work spindle. The head stock is movable in the vertical and horizontal direction, with the vertical and horizontal stroke being equivalent to the feed for the turning operation and also to the movement of the chuck to a horizontal workpiece supply and removal station located laterally. A pick-up process is also proposed in this publication.

DE-PS 27 39 087 proposes a machine tool with a workpiece table that is rotatable, indexable and longitudinally adjustable on the bed. A cross beam, running crosswise over the bed, is supported on columns with a slide that can be moved horizontally on the cross beam. A tool carrier is located on the slide that can be shifted vertically and a tool holder with a tool spindle, attached on its lower end sector can be pivoted about a horizontal axis and locked in various pivoted positions in which the rotary drivable tool can be inserted by a clamping mechanism. A rotary drive is provided for the tool spindle including a motor and a gear train, with a possibility for an alternate fitting of a stationary rotary tool on the lower end of the tool carrier, and with a tool turret or magazine and an automatic tool changer. At the lower end of the tool carrier an additional, permanently mounted tool holder with an associated clamping device for receiving the stationary rotating tool is provided, with the pivotable tool holder being mounted on one side of the tool carrier immediately adjacent to the fixed tool holder and is automatically lockable in a pivotal position parallel to the holder, with the rotatable drivable tool is being interchangeable by the tool changer provided for the stationary rotational tool, whereby, simultaneously, the stationary rotational tool can be clamped in the firmly allocated tool holder and in the pivotable tool holder, and that both the clamping devices can be automatically actuated synchronously.

SUMMARY OF THE INVENTION

The aim underlying the present invention essentially resides in providing a machining center which enables simple as well as complicated machines to be simply and relatively inexpensively manufactured even where the linkages of the machines to transfer lines or flexible production systems is required.

In accordance with advantageous features of the present invention, a machining center constructed from assemblies is provided with each of the assemblies including a machine base or a machine structure on which, by means of guides over a compound slide, a motor driven main spindle is located that is adjustable via several axes, whereby facilities are provided on the machine structure for the collection of swarf and coolant, with a working area housing attached to the machine structure. The housing is formed by a container placeable on the machine base as a module to house the control elements and power supply. In the machine structure between the spindle, constructed as a motor spindle between the compound slide and operating according to the pick-up process supporting guides, openings are provided for the collection and removal of the swarf. The machine structure is provided with additional openings for a storage and transportation unit, and a probe is incorporated in the machine control for checking the machined workpieces. A sheet metal cover, fastened to the compound slide is sealed in the vertical direction with the sheet metal cover being penetrated by the motor spindle with a spindle attachment.

By virtue of the features of the present invention, the machining center may be of a modular design. The vertically arranged spindle unit with one to five axes can be both the tool spindle head as well as the workpiece spindle head.

The machining center of the present invention is suitable for drilling, turning, milling, measuring, hardening and welding for symmetrical or asymmetrical cylindrical or cubic components and, preferably, for so called chucking components.

The machining center of the present invention is advantageous in that the center allows inexpensive preproduction of main components so that the components can then be assembled in an economically favorable manner to provide the pertinent required machines. This permits a modular design with a considerable reduction in the cost of manufacturing. For example, in this manner, NC controlled lathes, machining centers, machining cells or link systems can be produced with the cost of manufacturing being considerably lower than manufacturing costs of customary or conventional systems, for example, the cost may be about half the previous cost of manufacturing.

In the machining center according to the present invention, the drive with the main spindle forms one unit as a so-called motor spindle. In this arrangement, the main spindle and drive are concentrically arranged with respect to one another and thus permit a compact design. The drive may, for example, include a highly dynamic frequency controlled maintenance free three-phase motor. A high rigidity for the spindle is achieved by utilization of precision bearings. For example, tapered ball-bearings at the front and cylindrical ball-bearings at the rear are especially advantageous. All bearings utilized are provided with lifetime grease lubrication. By a thermosymmetric design of the headstock and cooling system, practically constant precision is achieved. An additional type of design can also be equipped with a hydrostatic bearings.

The tool loading and unloading station may, in accordance with the present invention, be integrated in the front or operator side of the machine. This can be incorporated in a simple manner in the machining center of the present invention.

A possible tool and/or workpiece exchange can be carried out directly by the pick-up slide, with the slide picking up and depositing the tool in the loading and unloading position. The unloading position may be located directly in the working area or in an immediate storage outside of the working area in a vicinity of the measuring station.

The provision of partitions or doors between the working area, the loading and unloading station and between the measuring and tool storage stations permit virtually dirt-proof separation of these areas from each other. An automatic tool change can be simply incorporated in the machining center, and preferably operates when there is tool wear or during re-tooling but as a rule, not during a machining operation.

Where a pick-up automatic lathe is produced according to the invention, it is possible to carry out rapid workpiece and tool changes in addition to the turning operations. In additional, to the automatic lathe, all that is required is a simple inexpensive workpiece supply and removal belt outside the lathe which may be incorporated in the set of components of the loading and unloading station. By programming the cross-slide or pick-up spindle, the tool parameters can be used for loading and unloading the workpieces. All movements for the loading and unloading of the spindle, for cutting as well as for measuring the workpieces are executed with the pick-up spindle.

The machining center according to the invention permits deliberate separation of the loading and unloading station, the working area and the measuring zone. This separation of the three areas prevents swarf problems during loading and unloading of the workpieces or during measurement. The suspended workpieces contribute towards optimum swarf removal.

It is also possible to include measuring programs for tools and workpieces in the CNC control of the machine. In turn, this also makes it possible to measure both the tool as well as the workpiece immediately after a tool change or, for example, every tenth or twentieth workpiece during production.

A simple rapid tool change is achieved by clearing the working area with the cross-slide. For this purpose, the door between the loading zone and the working area is fully lowered.

A machine base or structure of reaction resin or polymer concrete, incorporated in the machining center, ensures the best thermal stability and excellent shock absorbing or damping characteristics. Compared with grey cast iron, reaction resin or polymer concrete has a six to eight-fold improved damping ratio. The torsionally rigid design eliminates the need for the usually required machine foundation. The machine can thus be installed on a normal factory floor. The large distance between both the high precision linear guides in the X-axis assures high rotational precision. The guides are also located outside the working areas and thus do not need covers against fouling or contamination.

The headstock unit with a compound slide is, for example, of a two-axis construction, namely, an X and Z construction. Short downtimes are achieved during workpiece and tool changing when approaching the measuring probe or scanner as compared with conventional designs by short traverse of distances and high rapid-traverse speed.

Rapid reaction, frequency controlled maintenance-free three-phase motors are preferably used for driving the compound slide. The motors propel the slides through high precision recirculating ball screws. Encapsulated measuring systems are located in linear axes X, Y and Z. The guidance and measuring systems are outside the working area.

The slide guidance systems are constructed, for example, with high precision, pretensioned linear roller guides, whose frictional coefficient is considerably lower than that of conventional sliding guides. This system ensures in the machining sector according to the invention, for example, in a CNC controlled lathe, a machining center or a cell, the highest rotational precision and high dynamics.

The cross-slide or compound slide with main spindle is equipped in all axes with suspended power supplies. The energy supplies are simply designed maintenance-free and located outside the swarf area and provide an additional contribution toward the simplification of the assembly.

The working area is separated completely from the loading and unloading zone as well as from the measuring zone, by both side walls of the reaction resin or polymer concrete structure, by two doors and by a cover panel that is traversable with the headstock and is sealed against a loss of coolant, lubricant and swarf.

Between the fixed enclosure of the container, designed as a power container and containing the control elements and the power supply, provided on both sides of the machine, a protective device for example, in a CNC controlled lathe, covers the front completely with aluminum slats. The slats are provided with windows and slits, with the windows providing a view of important areas for machine operations. Easy direct access to the axis drives is provided by covers in the side walls and on the upper side of the automatic lathe.

A cooling system controls the heat of the machine, for example, a CNC controlled lathe, which is constructed from a machining center according to the invention. The spindle bearings and the spindle drive are kept at constant temperatures.

Where an automatic lathe designed as a turning machine is built in a modular manner, the pick-up spindle and the workpiece may be moved out of the working area behind the turret for measuring the workpiece. For this purpose, a door is opened between the probe and the working area and, for example, a measuring is carried out by a permanently mounted measuring probe.

A tool measurement can be effected, for example, with a measuring probe fitted on the headstock. After exchanging a tool cutting edge, the probe emerges from its covering for measuring purposes. After a measurement, the actual data is computed directly in the control and the next workpiece is thus machined within a preset tolerance.

A swarf conveyor may also be provided beneath the structure to provide for swarf removal to the left or right of the machine or to the rear of the machine.

Instead of a swarf conveyor, a swarf trough or a flat swarf carrier may be used and be inserted in the machine from the left, right or from the front of the machine.

A vapor extractor for expelling coolant mist from the working area can be incorporated into the module.

A module according to the present invention can be used especially advantageously in the manufacturing of lathes for chucked components, with the term chucked components meaning turned parts can be machined by cutting without additional support from the side facing away from the chuck.

The workpiece storage and conveyor belt with a loading and unloading station, to be incorporated in the module may, in accordance with the present invention, be of a reset-free construction. The pick-up spindle may deposit the finished components in the workpiece storage after which the conveyor belt indexes further and the spindle picks up the next blank. The conveyor belt can be designed as an indexed chain conveyor with transport prisms.

The spacing between the transport prisms on the conveyor belt and thus the storage capacity depends upon the chuck diameter used. Thus, for example, with a large chuck diameter, there would be a large spacing between the transportation prisms. The storage capacity may be, for example, twenty-five workpieces. The workpiece are suitably positioned so that they can be picked up by the pick-up spindle. Different workpiece heights are defined in the NC component program. A good workpiece fit in the chuck is ensured by a pressure unit in the conveyor belt and, for this purpose, the pick-up spindle is moved against the spring loaded pressure unit.

Also included in the respective module or machining center is a shifting device which may be incorporated for shifting the workpieces from one conveyor belt to another.

Additionally, a workpiece shifting device with a turning unit may be incorporated in the machining center for simultaneously turning and shifting the workpieces machined on one side.

Since the machine construction encloses the working area, a compact design is obtained. In addition, this enables the machine base to take on several functions, namely, the support of the machine tool to be assembled, for example, a lathe, on the factory floor or support surface without an additional base, supporting the headstock unit with the compound slide and motor spindle and to support the storage and transportation unit as well as to shield and enclose the working area with the components required for this purpose.

In accordance with further advantageous features of the present invention, the openings protected by a shaped metal sheet that is cast as a lost shape in the machine base or structure.

The machine base or structure according to the present invention encloses the working area on three upright vertical sides and from below, namely, from the opposing, vertical side wall and the vertical rear wall as well as from beneath, that is, from the floor thereby producing a closed encapsulated design which virtually prevents possible sound and odor emissions.

By virtue of the casting of the machine base or structure from a reaction resin or polymer concrete in accordance with the present invention, excellent thermal stability with outstanding damping characteristics is realized.

In accordance with the present invention, the machine base or structure may be shaped in a H-shape in an orthogonal cross-section to a longitudinal axis of the machine base or structure. It is also possible for the machine structure to be of an approximately U-shape construction in an orthogonal extending transversely to the longitudinal axis. Moreover, the machine base or structure may be of an approximate L-shape construction in an orthogonal extending transversely to the longitudinal axis.

By providing a L, H or U-shaped construction vertically arranged webs or beams of the H-shaped cross section are vertical and parallel to each other while the web is horizontally located.

Advantageously, in accordance with the present invention, the machine base or structure is located on removable machine pedestals that produce an intermediate space between a lower portion of the machine structure and the floor or support surface. By virtue of the provision of the pedestals fashioned, for example, as feet or legs beneath the machine structure, easier transportation and installation at a suitable site of the machine structure with a forklift truck or something similar can readily be realized. The pedestals or feet are removable for transportation in buildings having a low clearance. Moreover, the provision of the pedestals or feet also permit the insertion of a swarf conveyor or a swarf truck into the machine from all four sides.

The construction formed through the H or U-shape forms a stable base for the attached assemblies. The guides of the compound slide are placed on top of the side walls. The bases for fastening the tool system and the probe are located between the guide walls in the upper section of the H or U-shape.

Openings, primarily in the swarf and coolant area, are protected by a sheet cast or a lost mold in a reaction resin or polymer concrete body. The metal casting protects the base in the swarf and coolant area. Additional openings are provided for the return of the storage and conveyor belt in a possible variation.

The H or U-shape permits the guides of the compound slide to be pulled out a considerable distance forward above the machining position thereby providing a stable base for the multifunctional slide. The machine cover is a solid panel fastened at the bottom to the compound slide and seals the working area at the top.

When the base is designed as a U-shape in an orthogonal cross section to its longitudinal axis, the sides of the U-shape will be in the vertical plane and parallel to each other, while the connecting web of the U-shape is horizontally located and extends in parallel to a foundation or floor.

Previously, enclosed bases with guides running horizontally, diagonally, or vertically were used in lathes, with the guides being covered with telescopic covers; however, practical experience has shown this approach is disadvantageous. In such constructions the swarf drops onto the guides and covers. Moreover, this type of machine structure requires complex panel coverings with power supplies in the swarf area and a large space requirement for the complete machine.

In accordance with the present invention, guides are located on the upper side of the machine frame, with the guides being constructed as parallel running guide rails respectively located on the upper side of the side walls of the machine base or structure.

By virtue of the last noted features of the present invention, the sides of the H or U-shaped machine base or structure have on their upper face one parallel rail for each headstock unit and compound slide. The compound slide is guided with suitable guides, for example, on the parallel rails in the horizontal plane (X axis). The compound slide has, at one end, spaced vertical guides or rails, on which the motor spindle unit is adjustably located in the vertical direction between the vertical walls of the machine structure. Where the machine base or structure is H or U-shaped in cross-section, the longitudinal section of the motor spindle unit passes in an area between the vertical webs or respective walls of the machine structure. This also contributes toward a compact design of the machine.

The power container incorporated in the machining center of the present invention can be executed as a free-standing sheet metal construction which completely preassembled is placed on the fully assembled basic machine composed of the machine base, motor spindle, compound slide and tool system. The power container is fastened with a few bolts and contains the completely installed control cabinet with projecting preassembled connections to consumers. The individual cables are placed in racks and are suspended in loops and lead to moving consumers, with which they are connected by plugs.

A cooling unit for the spindle and control cabinet cooling is provided on the control cabinet, while the hydraulic respective air supply is located beneath the control cabinet.

The water, hydraulic or air hoses are suspended, as with the power or electric cables, in swings or loops to the consumer. When the assembly of the basic machine has been completed, the power container is connected with the basic machine in the manner similar to the body of a motor vehicle. The consumers are connected and the machine is virtually ready for use. This produces time saving and inexpensive assembly with a minimum consumption of material.

Previously, it was conventional on lathes to bolt the various power generators, such as the control cabinet, hydraulic power pack, cooling unit and air supply individually to the support frame or machine wall or to connect these free-standing with cable ducts. For transportation, they were frequently disassembled and subsequently reassembled which resulted in the incurring of high costs.

According to the present invention the machine base or structure may serve as a stationary unit for the fitting of tool boxes and/or turrets and a multifunctional lower machining unit may be provided in an area enclosed by the machine base or structure.

Advantageously, the shaft of a multiple turret, for example, a double turret with tool carriers may be located within an area enclosed by the machine base or structure in the side walls of the machine structure.

The guide rails for the compound slide may, according to the invention, be drawn forward beyond the machining position up to a storage and conveyor belt located thereat.

The headstock unit, according to the present invention, consisting of the motor spindle and the compound slide being of a two axis design, whereby the compound slide in the X-axis and the motor spindle are located in a CNC controlled traversable position in the Z-axis and the motor spindle is traversable by way of a storage and conveyor belt.

According to the present invention, the compound slide may be driven by a rapid reaction frequency controlled maintenance-free three phase motor which drives the compound slide by way of high precision ground recirculating ball screws, whereby an encapsulated linear measuring system is fitted in the X-axis and a rotating measuring system in the Z-axis, with both guidance systems being located outside the working area.

According to the present invention, the container may be constructed as a self-supporting sheet metal construction, with the container completely or partly enclosing the machine structure from above and over at least three sides. The container houses the completely installed control cabinet with projecting preassembled plug connections to the consumers.

Advantageously, the connections also having electric cables, installed in racks, whereby the racks are one-part linked with the container while the connections, in particular the electrical cables, are installed in loops to permit an unhindered movement of the compound slide and/or the motor spindle.

The container, according to the present invention, may also contain a cooling unit for the spindle and control cabinet cooling and the hydraulic respective air supplies, whereby the electric cables, the water, hydraulic or air hoses are laid in loops to the consumers and are also installed in racks.

The present invention is further characterized by a loading and unloading zone, the working area and a measuring zone located in series in the X-direction, with the working area being separated by a door that can be opened and closed incorporated in the machine control.

The machining center of the present invention having a single axis multifunctional machining system may be fitted with an additional positioning axis for single or multiple-spindle drilling of a workpiece with a rotating or non-rotating chuck on a single axis compound slide with a positioning axis, with a tool post holder, with stationary or rotating tools or a multiple rotary tool turret with stationary or rotating tools. With such a construction, it is possible to grip and chuck a blank and deposit a finished component in the loading and unloading zone of the storage and conveyor belt. Moreover, center machining processes may be carried out with such processes being, for example, turning, grinding, drilling, etc. as well as partial non-cutting machining processes such as planishing, rolling, calibrating, etc. It is also possible to measure workpieces with a measuring probe located on the base and, when required, automatic exchange of worn tools by tool pickings devices indexing to the storage and conveyor belt by the tool gripper on the upper operating unit may be effected. It is also possible to measure the exchanged tools with a measuring probe located on the upper work spindle or by a measuring probe located on the upper compound slide, that is adjustable in the working area.

A machining center for the construction of a two-axis multifunctional machining system for machining workpieces with two axes, according to the present invention, includes a two-axis multifunctional compound slide, with a motor spindle, tool post holder or multiple rotary tool turrets and stationary tools. With such an arrangement it is possible to grip and clamp a blank and deposit a finished part in the loading and unloading zone of the storage and conveyor belt. Furthermore, center machining processes such as, for example, turning, grinding, drilling, etc as well as partly also non-cutting machining processes such as planishing, rolling and calibrating may be carried out. Measuring of the workpieces with a measuring probe located on the machine base may be effected, and, when required, automatic exchange of worn tools by tool picking devices indexed to the storage and conveyor belt can be carried out by the tool gripper on the upper machining unit. To measure the exchanged tools, the measuring probe may be located on the upper motor spindle or the measuring probe may be located on the upper compound slide and be positionable in the working area.

According to the present invention, a machining center for the assembly of a three-axis multifunctional machining system that is used for the machining of workpieces with two-axis multifunctional compound slide, with a spindle unit with a C-axis, a tool post holder or multiple rotary tool turret with or without rotating tools may be provided. With such a construction, gripping and chucking a blank and depositing of a finished component in the loading and unloading zone of the storage and conveyor belt can be carried out as well as center machining processes, namely, turning, grinding, drilling, etc. as well as partly non-cutting machining processes such as planishing, rolling, calibrating, etc. may also be effected. The measuring of the workpieces may be effected with a measuring probe located on the machine base and, when required, automatic exchange of worn tools by tool picking devices indexed to the storage and conveyor belt can be realized by the tool gripper on the upper machining unit. The measurement of the exchanged tools is carried out with a measuring probe mounted on the upper work spindle or by a measuring probe located on the upper compound slide positionable in the working area.

The machining center of the present invention is also applicable to an assembly of a four-axis multifunctional machining system for the machining of workpieces with three-axis multifunctional compound slide, with a spindle unit with a C-axis and a transverse double turret or a multiple tool mounting beam, with the double turret having stationary and rotating tools. With such a construction, gripping and clamping of a blank and deposition of a finished part in the loading and unloading zone of the storage and conveyor belt is possible and it is also possible for a five-sided machining for all possible metal removing as well as partly also non-cutting machining processes, such as, planishing, rolling, calibrating, laser welding and similar processes. A measurement of the workpieces may be effected with a probe located on the machine base and, when required, automatic exchange of worn tools by tool picking devices indexed to the storage and conveyor belt may be achieved by the tool gripper on the upper machining unit. A measuring of the exchanged tools may be carried out by a measuring probe mounted on the motor spindle or by a measuring probe located on the upper compound slide and positionable in the working area.

The present invention is also applicable to a machining center for the assembly of a six-axis, multifunctional machining system for the complete machining of a workpiece in two settings with three-axis multifunctional compound slide with a spindle unit having a C-axis and a lower multifunctional machining unit and with an E-axis for swiveling and with a spindle unit with a F-axis. With a machining center for a six-axis multifunctional machining system it is possible to grip and clamp a blank and deposit a finished part in the loading and unloading zone with the clamping device, for example, a chuck on the upper working or machining unit. Moreover, a five-sided machining in all angular positions may be effected for all possible metal removing or partly also for non-cutting machining processes such as planishing, rolling, calibrating, laser welding, etc. Furthermore, a measuring of the workpieces may be carried out with a measuring probe located on the machine bed and, tools may be removed by tool grippers that are fastened on the upper machining unit from the lower work spindle and transferred to a storage belt and vice versa. It is also possible to measure the exchanged lower tools with the measuring probe located on the upper compound slide that is adjustable in the working area.

Furthermore, it is possible to remove the safety cap from the clamping device of the lower machining unit by the tool gripper of the upper unit and to transfer to the storage belt and vice versa. A semifinished workpiece may be reclamped in the clamping device of the lower machining unit and the upper workpiece chuck can be covered by directly receiving the safety or protective cap from the storage belt or vice versa. A changing of the machining tools in the upper work spindle directly from the storage belt in the loading and unloading zone is possible as well as a redepositing of the tool therein. The tools exchanged in the upper work spindle may be measured by a probe located on the structure, and still unmachined workpiece surfaces for the workpiece that is clamped in the lower work spindle may be machined with all the above noted machine processing also being possible. The components that are clamped in the lower work spindle may be measured with a measuring probe located on the upper compound slide, adjustable in the working area, and removal of the finished workpieces can be removed from the lower operating unit and transferred to the storage belt.

A machining center for the assembly of a seven-axis multifunctional machining system is also possible in accordance with the present invention and enables a complete machining of a workpiece in two settings with four-axis multifunctional compound slide with a D-axis, with a spindle unit with a C-axis and a lower multifunctional machining unit and with an E-axis for swiveling and a spindle unit with a F-axis.

With such an arrangement, a gripping and clamping of a blank and deposition of a finished part is possible in the loading and unloading zone with the clamping device, for example, a chuck on the upper operating unit. Furthermore, a five-sided machining in all angular positions is possible for all possible metal removing as well as partly also for non-cutting machining processes such as planishing, rolling, calibrating, laser welding, etc. The workpiece may be measured with a measuring probe located on the machine base and, tools may be removed by tool grippers that are fastened on the upper machining unit from the lower work spindle and transferred to the tool magazine and vice versa. The exchanged lower tools may be measured with the measuring probe located the upper compound slide and positionable in the working area. A removal of a safety or protective cap from a clamping device of the lower operating unit by the tool gripper of the upper unit to transfer to the storage belt and vice versa is possible, with a reclamping of the semifinished workpiece in the clamping device of the lower operating unit. The upper workpiece chuck may be covered by directly receiving the safety cap from the storage belt or vice versa and the machining tools in the upper work spindle may be changed directly from the storage belt in the loading and unloading zone and redepositing of the tool therein. The tools exchanged in the upper work spindle may be measured with a measuring probe mounted on the machine base, and machining of the still unmachined workpiece surfaces for the workpiece that is clamped in the lower work spindle and for subsequent carrying out of all of the above described machining processes is also possible. The components that are clamped in the lower work spindle may be measured with a measuring probe located on the upper compound slide, adjustable in the working area, and the finished workpieces may be removed from the lower operating unit and transferred to the storage belt.

The bearings of a spindle may, in accordance with the present invention, be cooled at a constant temperature and according to the present invention, a three-axis compound slide bearing, for example, a slide valve may be provided over the guide for the X-axis with the compound slide for the Y-axis.

The lower multifunctional machining unit may, in accordance with the present invention, be equipped with several fixed tools and an off-center mounted motor spindle. The complete unit can be swiveled by CNC control, whereby the motor spindle with its swivel axis can operate in every required angle. The motor spindle may be driven in an infinitely variable manner by a fitted or external AC-motor, with the motor spindle bearing a combined workpiece and tool clamping device for the alternate mounting of tools and workpieces. The motor spindle may have a CNC controlled axis.

The storage and conveyor belt may, in accordance with the present invention, be equipped with angular drives for the workpieces and tools and, a safety housing of an aluminum lamina shaped as a roller blind may cover the front area of the machine.

The workpieces being machined with a single or multiple axis multifunctional compound slide with one motor spindle and a U-axis in the CNC facing head for adjustment of the tools may, in accordance with the present invention, effect a gripping, clamping and deposition of the workpiece from an indexing belt by a clamping device with such being carried out, for example, for central machining processing such as contoured turning, internal cutting and face turning.

The machining center of the present invention may be supplemented by a combined workpiece and tool clamping device which may be used within the multifunctional upper and lower operating units and include a centrally clamping multi-jaw chuck or any special chuck with a central tool mount. Both clamping devices, namely, tools and chucks, are actuated by a drawbar. The safety or protective cap prevents contamination of the workpiece clamping jaws when used as a tool clamping device. This combines the chuck and the tool mount whereby one draw bar actuates both.

Alternative use as a workpiece chuck or a tool mount is possible with out conversion, whereby the chuck replacement or use of a special tool mount is provided in the multifunctional operating unit.

The machining center can also be supplemented by a lower multifunctional operating unit with several stationary tools and an off-center mounted work spindle. The complete unit pivots under CNC control and the work spindle can thus operate in its pivot axis, namely, the E-axis, at any required angle. The work spindle is driven continuously by a built-in or external AC motor, and the work spindle can have a combined workpiece and tool clamping device for the optional mounting of tools and workpieces, with the work spindle having a CNC controlled axis, namely, the F-axis.

Conventionally, separate units are provided on separate or a common work slide or turret with rotating tools for usually subordinate work. The service life of these tools is frequently low.

The invention provides for the combination of a fully rated work spindle with a multiple rotary tool turret on one axis. The off center mounted work spindle permits the use of a supplementary spindle with a favorable short Z-stroke thereby permitting the combined use of the work spindle, in which the spindle can be intended as a workpiece carrier and as a tool carrier. This enables the finished machining of all parts in one system or machine. This is especially advantageous when machining from a solid material, for example, for prototype machining, since no expensive jigs are required. Additionally, the use of normal standard tools and chucks is possible.

Furthermore, the present invention enables rotationally symmetrical as well as cubic parts to be machined. The use of a four-jaw, two-jaw chucks and special clamping devices is possible. When soft jaws are used, these can be machined by the opposing chuck to the required precision. In the machining center according to the invention, it is possible to integrate a storage belt with the conveyor belt for workpieces and tools. Prismatic drivers, pallets that have been adapted to the component shape or plate chucks or other component dependent drivers can be used for the workpieces.

For tools it is possible to equip tool pallets with tools which can be positioned facing up and down. The belts can be of a single of duplex design, located to operate in parallel or individually around the machine, forward of the machine or through the machine.

Due to the friction between the stationary support and the part of the pallet, the driver holds the part or the pallet safely while braking and when at rest. The conveyor belt is adjusted to be the pertinent component diameter by a simple adjustment on the drive during the set up procedure.

This provides the advantage of a universal, virtually set-up free transportation belt with positioning of the workpieces and tools for gripping and clamping in the chuck and the tool pick-up in conjunction with a simple pressure station of sheet metal components for precise placement of the workpieces or tools in the chuck.

Previously, pallets with rollers or sliding shoes were used, on which a component was placed in the middle, for example, for oval transportation. There are a multitude of incremental indexing belts, but no system in which a transport prism moves a round component so that with its center passes through a location in the middle of the transfer position. In conventional versions, feed-limiting devices or suitable facilities must be provided so as to position the component in the center.

The automatic replacement of worn tools as well as the exchange of tools in the clamping devices during set up can be integrated in the machining center according to the invention.

The tools are prepared on the storage and conveyor belt in exchange pallets. Where required, the pallets are placed onto the belt instead of the workpieces centered by the prismatic chain and indexed further.

The tool gripper jaws on the multifunctional compound slide pick up the first worn tool from the tool carrier and place the tool in the first empty tool holder pallet on the storage belt.

The first new tool is then placed in that position of the tool carrier that has just become empty. The second worn tool is gripped and placed in the pallet that previously became empty. The procedure is repeated until all worn tools have been replaced. The replaced tools are removed with the pallets from the belt so as to free the belt for workpieces.

The tools that have not been preset, are measured by the measuring which is installable probe in the upper working unit or which is already present. The tool dimensions are automatically stored in the machine control.

For the initial measurement of the tool mounting positions and for verification after collisions, a calibrating stud can be inserted instead of a tool and then measured with the measuring probe, whereby the new starting or basic position for the tool mount is stored in the machine data. This provides a simple tool changing system whereby the simplest readjustment is possible after collisions.

In this version, a tool is exchanged automatically in a simple manner without costly tool storage and without a tool change alarm, purely by a gripping device. By placing the tools on the workpiece conveyor belt, only that amount of space is required that is needed by the tools.

Previous tool changers and storage devices are expensive, voluminous units which, in many cases, considerably hinder machine operations. Tool carrier systems can also be integrated in the machining center according to the present invention.

A tool post holder placed on the base can be used instead of a multiple rotary tool turret. With individual tool mounting for simple machining operations, stationary tools can be used in conjunction with rotating tools on the upper working unit for turning and drilling, or rotating tools for drilling and milling as well as for off-center machining as well as multiple-spindle drill heads.

Additionally, for systems with two or more axes, tool beams with several tool mounts can be placed linearly in the X-direction to the spindle center and/or parallel to the spindle center, for stationary tools for turning and drilling or for rotating tools for drilling, single and multi-spindles and for milling, in combined stationary-rotating for turning, drilling, milling, possibly also several tool beams, located in parallel with the stationary and/or rotating tools for use in systems with four or more axes.

Turrets, placed on the base with parallel swivel axis to the X-axis can be used as a multiple rotary tool turret with various tool mounting systems, short pivot times by three-phase servomotor with direction logic. In addition, those for stationary tools for turning, drilling, rolling, etc., or for the powered tools in some stations for turning, drilling, milling, etc.

It is also possible to use double turrets with a pivot axis that is transverse to the X-axis with two parallel tool carriers, one tool carrier for stationary tools for turning or for similar use, the second tool carrier for pivotal tools of higher driving power for drilling and milling, possibly also for the use of multi-spindle drill heads.

Advantageously, according to the present invention, the motor spindle is centrally located in the compound slide and the motor spindle may be movably mounted in a hydrostatic guide in the vertical direction.

The loading and unloading zone of the present invention is advantageously located behind the working area inside the machining center with the storage and conveyor belt being passed by way of openings into the back of the machine structure in the loading and unloading zone through the machining center.

The measuring probe is adapted to be automatically swiveled into the working area after a door is opened, and a measuring zone is located partly in the working area as well as in the loading and unloading zone.

An area is available between the machine structure and a control cabinet in which the hydraulic power pack, a central lubricating unit as well as a heat exchanger are located, with such area being locked by at least one door.

The energy or power container is of a L-shaped construction in a side view and is constructed in such a manner that the electrical, hydraulic and/or air supply lines required for operating the machine are preassembled and, for example, are plug connectible mainly in the horizontally arranged L-arm. The control cabinet, the hydraulic power pack as well as the central lubricating unit and the heat exchanger with at least one door are located in the vertically associated arm and the horizontally located L-shaped arm covers the machine structure from above and a part of the associated vertical L-shaped arm of the one front wall of the machine structure.

The above and other objects, features, and advantages of the present invention will become more apparent from the following description when taken in connection with the accompanying drawings which show, for the purpose of illustration only, several embodiments in accordance with the present invention, and wherein:

BRIEF DESCRIPTION OF THE DRAWINGS

FIG. 2 is an exploded perspective view of a partial machining center of the present invention;

DETAILED DESCRIPTION

Figure 1:
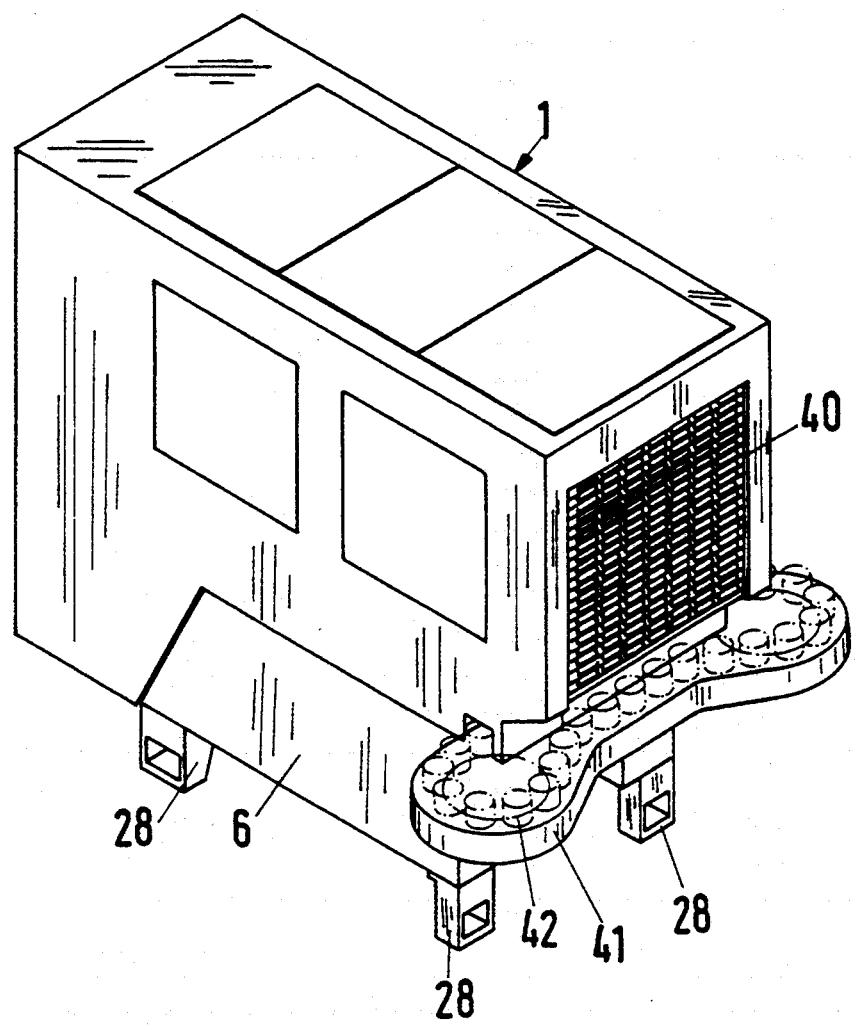
FIG. 1 is a perspective view of a machining cell assembled from the machining center according to the present invention.

FIG. 1 illustrates a machine constructed from a kit according to the present invention when used on a CNC controlled machining cell 1, also known as a machining center. Individual main components of the kit according to the present invention are especially noticeable in FIGS. 2 and 3, with the kit mainly including a power container 2, a motor driven spindle 3, a sheet metal cover 4, a compound slide 5 and a machine base or structure 6.

The power container 2 is constructed as a free-standing sheet metal construction that is placed complete preassembled and on the completely assembled basic machine and is fastened by a few bolts. The power container 2 contains the completely installed control cabinet with projecting, preassembled connections to consumers. The individual cables 7 as well as the hydraulic and/or air supply lines (FIGS. 3 and 20) are laid in racks 8 and are suspended in loops so that the cables and lines are capable of following movements of the motor spindle 3 and the compound slide 5. The cables 7 are connected by plugs to the individual consumers so that the couplings can be quickly disconnected as well as reinstalled.

A cooling device (not shown) is provided on the control cabinet for spindle and control cabinet cooling, while the hydraulic and air supply is located beneath the control cabinet (not shown). The water, hydraulic or air hoses (not shown) are passed to the consumers in the same manner as the electric cables 7, in loops, in the same manner as described hereinabove in connection with the cables 7.

The power container 2 is connected to the basic machine at the end of the assembly in a manner similar to the attachment of a vehicle body to a motor vehicle thus providing the visible external appearance shown in FIG. 1. The consumers are then connected and the machine is practically ready for use. This produces a considerable time saving and represents an inexpensive process with a minimum consumption of material.

Motor spindle 3 includes a motor 10 and concentrically surrounding spindle. The motor 10, in the illustrated embodiment is a highly dynamic frequency regulated maintenance free three-phase spindle motor with 10/16 kW metal cutting capacity at 100/40% duty cycle.

Figure 3:
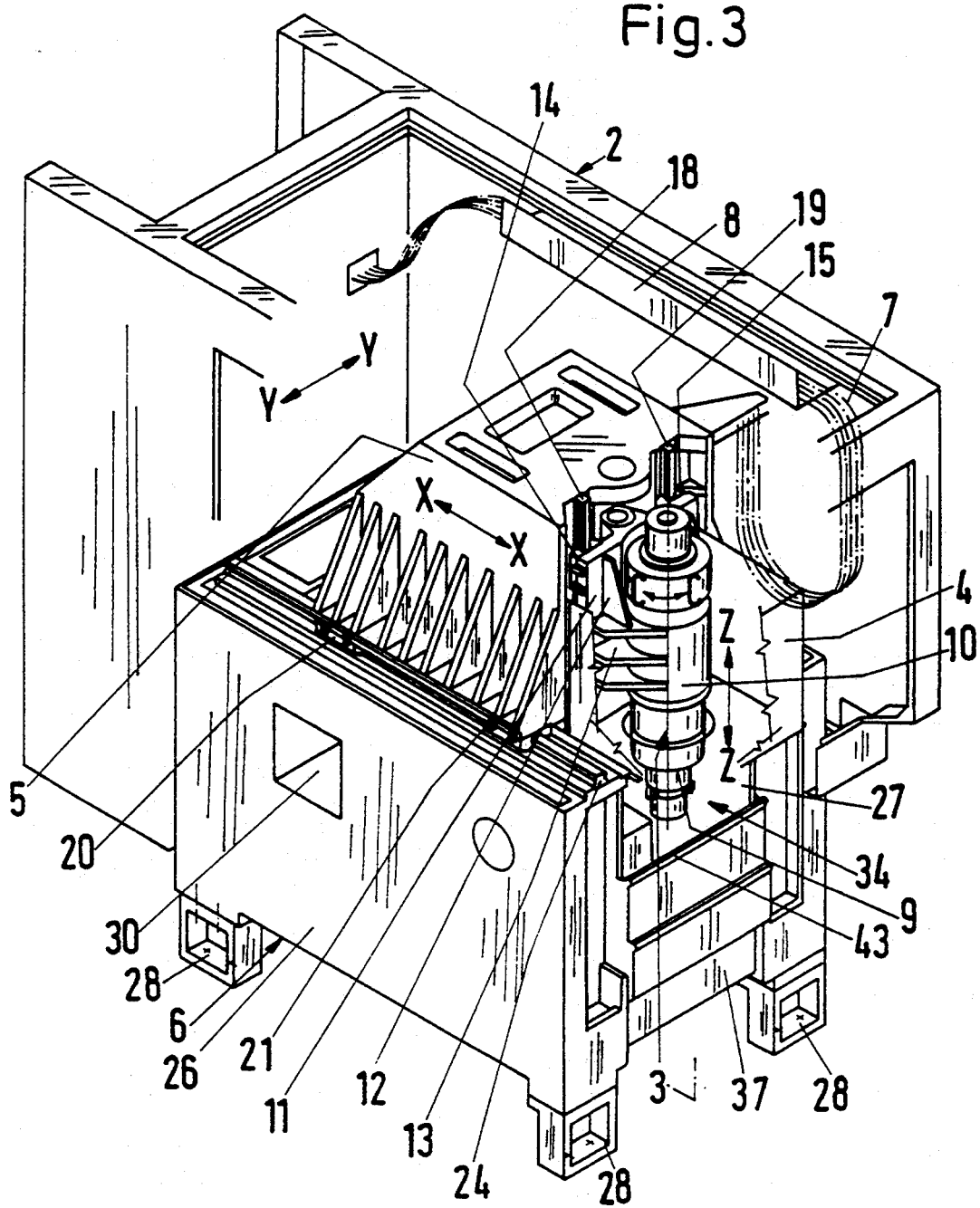
FIG. 3 is a partial cut away perspective view of the machining center of FIG. 2 assembled to form a machining cell of FIG. 1.

Motor spindle 3 is mounted in a support unit 11 made handled-shaped and connected integrally with the motor housing by a plurality of ribs 12, 13 (FIGS. 2, 3).

Support unit 11 is firmly attached by two pairs of equally sized guide shoes 14, 15 and 16, 17 of equal size and arranged with a distance between them by screwing or the like and guided in a vertical plane on guide rails 18, 19 of the compound slide 5.

In the embodiments shown in FIGS. 2 and 3, the headstock unit, composed of the motor spindle 3 and the compound slide 5, is made with two axes. This means that the compound slide 5 is adjustable under CNC control in a horizontal plane, in the direction of the X—XXs, and the motor spindle 3 is similarly adjustable in the vertical plane in the direction of Z—Z. To approach the various zones on the X-axis (horizontally), the travel is 560 mn for example. Short downtimes for the changing tools and applying the measuring probe are also achieved due to a rapid high speed.

For example with a motor spindle 3 having a spindle head size for, a diameter of 75 mn for the front bearing and a speed of 8,000 rpm. A high rigidity of the spindle can be achieved through precision bearings, with angular ball bearings at the front and cylindrical roller bearings at the rear, and with all bearings having a lifetime grease lubrication. The thermosymmetric design of the headstock unit 3, 5 and a cooling system insures a constant accuracy.

The compound slide 5 is driven by a fast reaction frequency controlled, maintenance-free three-phase motor. This drive motor propels the compound slide through the high precision ground recirculating ball screws. Fitted in the X-axis is an encapsulated linear measuring system, and, in the Z-axis a rotative measuring system. Both guidance systems are located outside the operating or working area in the manner described more fully hereinbelow.

The compound slide 5 is driven by a fast reaction frequency controlled, maintenance-free, three-phase motor. This drive motor propels the compound slide 5 through high precision ground recirculating ball screws. Fitted in the X-axis is an encapsulated linear measuring system and, in the Z-axis a rotative measuring system. Both guidance systems are located outside the operating or working area.

The compound slide 5 has, on each side, spaced equal sized guide shoes 20, 21, 22, 23 (FIG. 2). The guide shoes 20-23 are linked, in a releasable manner, with the body of the compound slide 5 by bolts or similar items to form a single part.

The guide shoes 20, 21 and 22, 23 are respectively guided on guide rails 24 and 25 that are spaced from each other and extend in parallel with respect to each other. The guide rails 24, 25 for the compound slide 5 as well as the guides 18, 19 for the support unit 11 with the motor spindle 3 with the guide shoes 14, 15, 16 and 17 may, for example, be provided with high precision, pretensioned linear roller guides, whose frictional coefficient is over ten times lower than that of the conventional slide ways. The construction of the system in this manner ensure high rotational precision and high dynamics.

The motor spindle 3 and the compound slide 5 are equipped in both axes with suspended power supplies. They are simply constructed, maintenance-free and located outside the swarf area.

Figure 4:
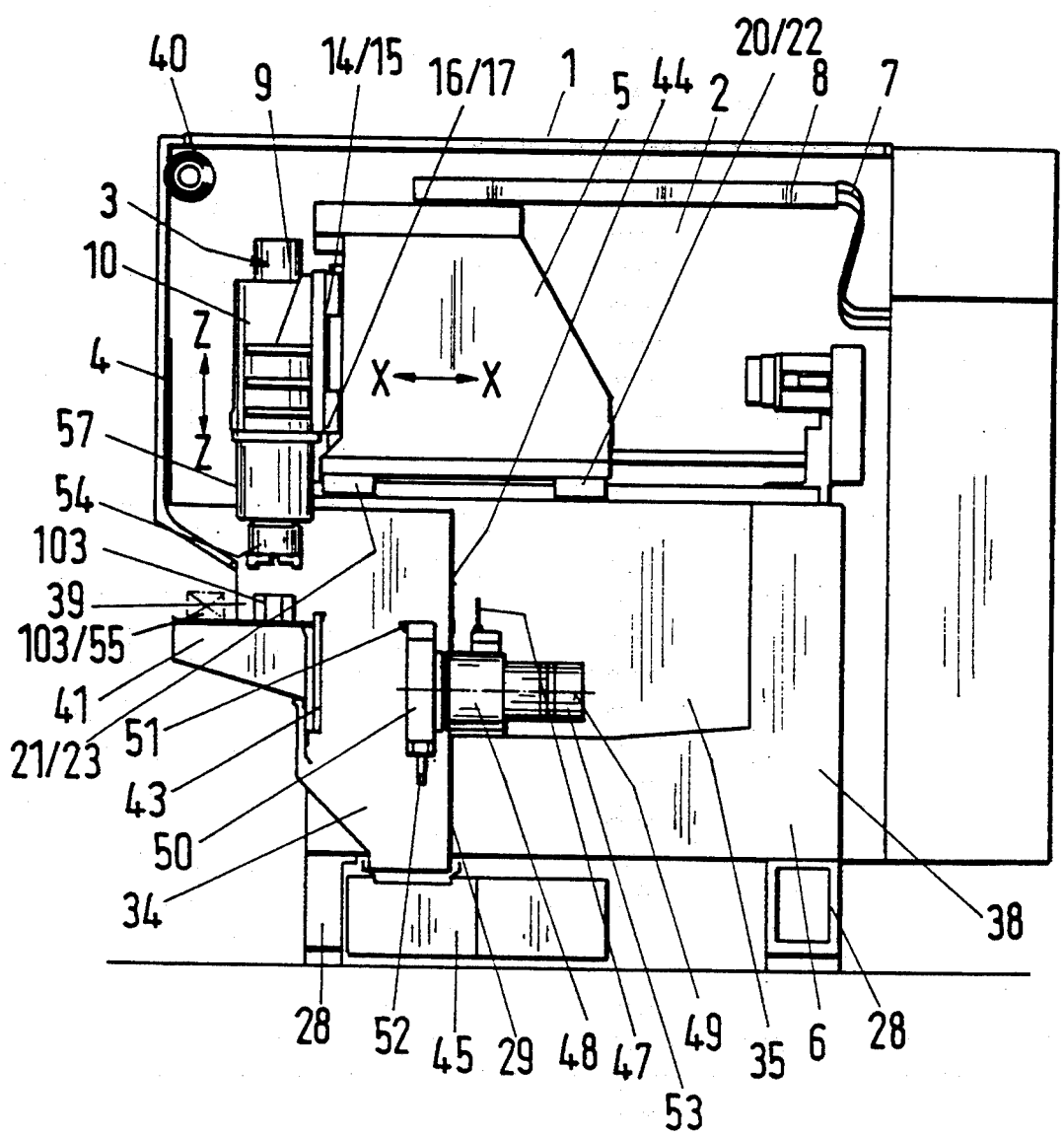
FIGS. 4–17 are schematic views of the machining center according to the present invention assembled from machining cells in various machining situations.

The structure 6 consists of a reaction resin concrete and has, especially in the construction shown in FIGS. 3 and 4, in an orthogonal cross-section, an H-shape that passes through its longitudinal axis, and thus has a stable base for the attached assemblies, that is, for the power container 2, the motor spindle 3, the sheet metal cover 4 and the compound slide 5.

Between the side walls 26, 27 (FIGS. 2, 3) in the upper part of the H-shape of the structure 6, are fastening bases for the tool system and a probe 47.

The structure 6 stands on four machine feet or pedestals 28, which are placed in the corner areas of the structure 6 and can be unscrewed, for example, for transportation of the machine with a forklift or similar equipment in low factory buildings and through gates.

Figure 19:
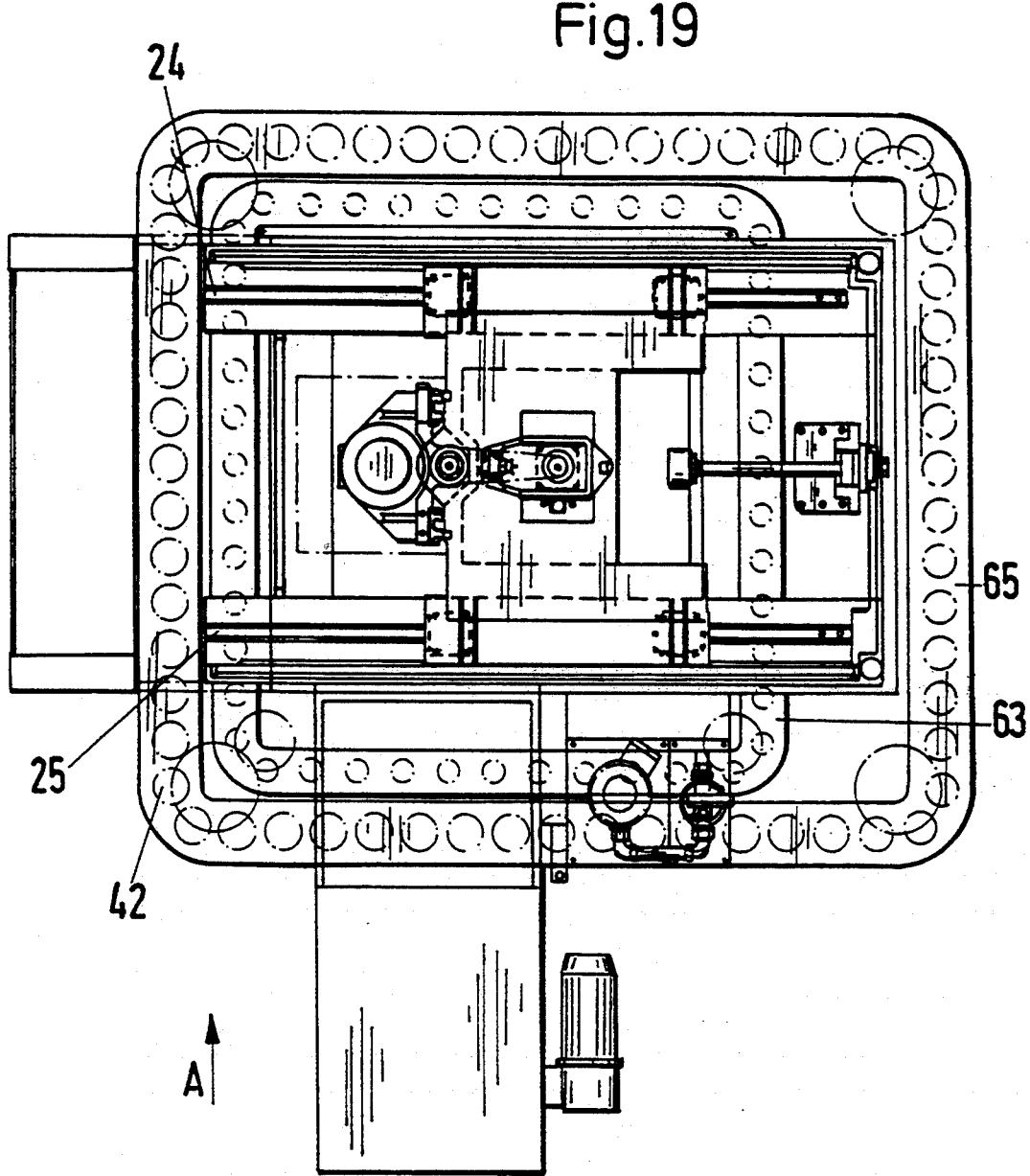
FIG. 19 is a plan view of the construction of FIG. 20 including a tool magazine.
Figure 20:
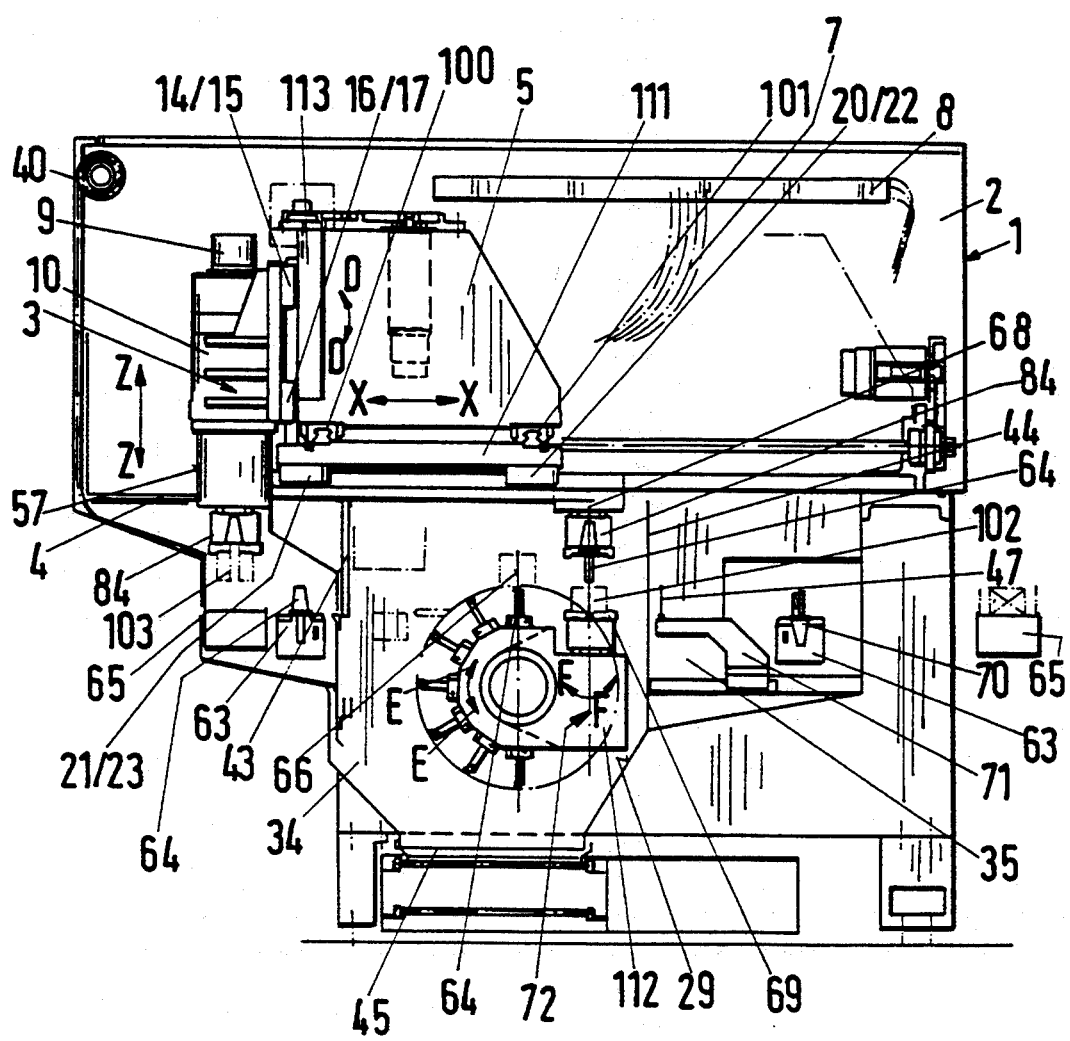
FIG. 20 is a view taken in the direction of the arrow A in FIG. 19.

The openings, accommodating the swarf and coolant, are protected by shaped sheet castings 29 cast as a lost form molds in the reaction resin or polymer concrete of the machine base or structure 6. Two additional openings 30, 31 are provided for the return of the storage and conveyor belt (not shown in FIGS. 1-3) and a possible variant (FIGS. 19, 20).

The guide rails 24, 25 are located on the top of the vertical and parallel side walls 26, 27 of the structure 6.

A work area 34 and a measuring zone 35 are enclosed by the side walls 26, 27 that form the U-shaped sides and the web 27 facing the base, connecting as one part, the material of the side walls 26, 27 as well as similarly one-part connected backwall 38 (FIG. 2). The area formed by the structure 6 is thus only open upwardly and toward the front of the machine. Upwardly, the area is covered by the compound slide 5 with the sheet metal cover 4, while located at the front is a loading and unloading zone 39 with a closure blind 40.

An endless storage and conveyor belt 41 (FIG. 1) passes through the loading and unloading zone 39, with the workpieces 42 being located on the continuous storage and conveyor belt 41. Tools can also be placed on the storage and conveyor belt 41.

The machine base or structure 6 serves also in the manner described below for mounting of tool carriers and turrets as a stationary unit. This permits a high tool time between overall (TBO) and, for example, may be 30-50% higher than in conventional constructions. Additionally, the structure 6 enables the fastening, described below, of a multifunctional lower working unit or a double turret in both the side walls 26, 27. This produces a simple working area covered with lower area requirement with respect to the maximum workpiece dimensions to be machined. The H-shape permits the guide rails 24, 25 of the compound slide 5 to be pulled well forward beyond the machining position. This provides a stable base for the multifunctional slide. The machine cover includes a firm sheet metal cover 4 that is fastened to the base of the compound slide 5, which closes upwards the well enclosed working area 34.

The cast shaped sheet metal panel 29 protects the machine structure 6 in the swarf and coolant area.

The working area 34 is closed by way of the front towards the loading and unloading zone 39 by a door 43 that can be moved in the vertical plane. On the diametrically opposed side, the working area 34 is tightly sealed from the measuring zone 35 by an additional door 44.

Swarf falls downwardly into a swarf conveyor 45 from where the swarf is transported away in a swarf truck 46 (FIG. 18), thereby ensuring the working area 34 is absolutely sealed from the loading and unloading zone 39 and from the measuring zone 35.

Figure 18:
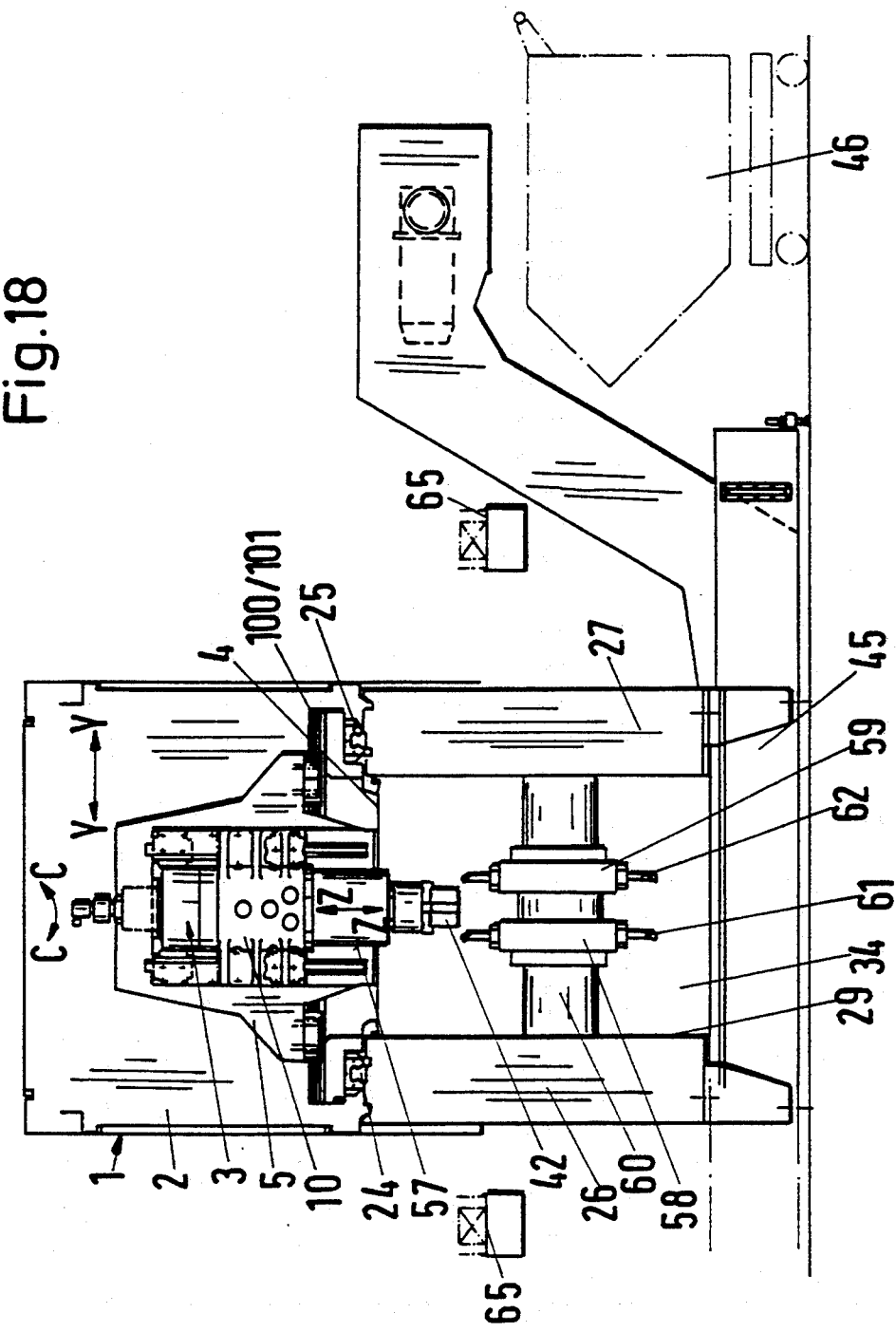
FIG. 18 is a schematic view of an additional machining unit assembled from a machining center according to the present invention.

Alternatively to the construction of FIGS. 1-3, in addition to the X, Z axis of the compound slide 5, there can also be a slide valve 111 allocated to form a Y-axis and/or a C-axis (FIG. 3) as shown in connection with the construction according to FIGS. 18-20, wherein the compound slide 5 is guided in the Y-axis direction on two spaced guide rails 100, 101.

A measuring probe 47 is located on a turret unit 48 and tool carrier 50 with horizontal axis 49. The tool carrier 50 bears on its circumference several tools, for example, a chisel 51 and drill 52, with a drive motor 53 being provided for the turret unit 48.

The motor spindle 3 can be moved by motor toward the Z-axis and has at its lower end a chuck 54 for the mounting of workpieces 42 from the storage-conveyor belt 41.

The motor spindle 3 plunges through a bore, adapted to its external dimensions (FIG. 2) in the sheet metal cover 4, into the working area 34. By way of the outer jacketing 57, the motor spindle 3 is sealed by a gasket (not shown) so that, at this location, the working area 34 is also sealed externally to be dirt and moisture proof.

All movements of the motor spindle, the compound slide 5, the tools 51, 52 and possibly the probe measuring 47 as well as the pick-up and transport of tools and workpieces is incorporated in the CNC control of the machine.

The storage and conveyor belt 41 may be reset-free and, on the storage and conveyor belt 41, the motor spindle 3, constructed as a pick-up spindle deposits a finish-machined workpiece 55, after which the storage and conveyor belt 41 indexes further after which the next blank 103 is picked up. The storage and conveyor belt 41 can be executed as an incremental belt with transport prisms. The spacing of the transport prisms and thus the storage capacity depends upon the chuck diameter, for example, a large chuck diameter requires a large space between the transport prisms. The workpiece blanks 103 are positioned in the center for mounting the motor spindle 3. Different workpiece heights are defined in the NC components program. Good workpiece mounting in the clamping device is ensured by a pressure unit in the storage and conveyor belt 41. For this purpose, the motor spindle 3 is moved against the spring-loaded pressure unit.

The following dimensions may be considered as an example for workpieces to be processed; namely, a workpiece diameter of 130 mm and a workpiece height of 75 mm. However, the subject matter of the present invention is not limited to such dimensions.

The operating mode of the examples illustrated in FIGS. 1–17 is as follows:

In addition to turning operations, the motor spindle 3 is also especially suitable in the pick-up spindle lathe, for example, for tool changing in just five seconds. For this purpose, apart from the lathe, a simple inexpensive tool supply and removal belt is required which includes the storage and conveyor belt 41. By programming the headstock unit 3, 5, the workpiece parameters for loading and unloading, the workpieces 103, 55, can be used. All movements for loading the motor spindle 3 for metal removal as well as for measuring the workpieces 55 are carried out with the pick-up spindle 3.

Figure 5:
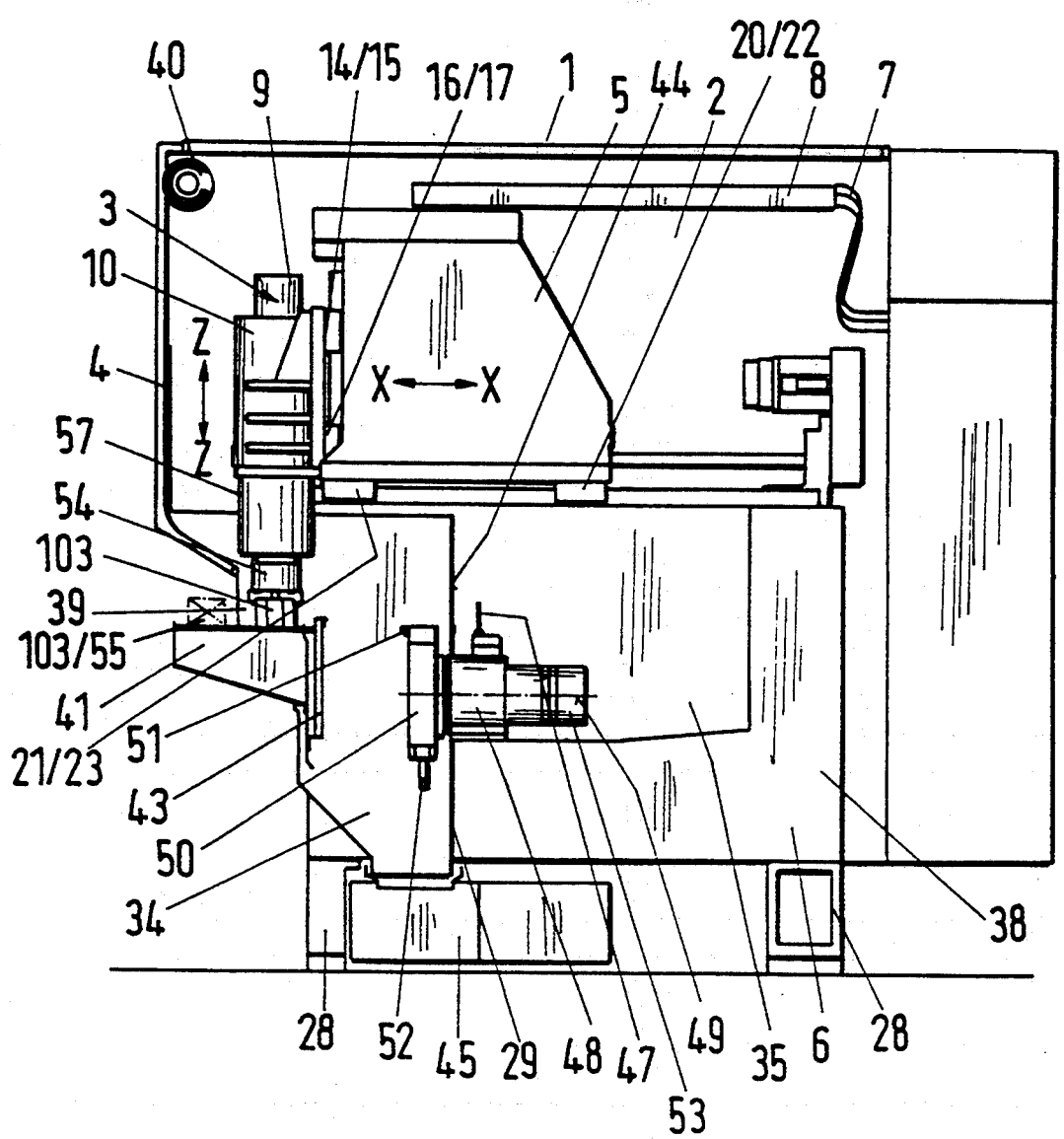

On the storage and conveyor belt 41 shown in FIG. 1, the workpieces 103 to be machined and those workpieces 55 which have been finished machined are conveyed. Presuming that the machine is in the station shown in FIG. 4, with the door 43 being already open, that is, in a completely lower position, the motor spindle 3 then traverses in a downward direction of the arrow Z and the chuck 54 grasps a workpiece blank 103 which is on the storage and conveyor belt 41. The motor spindle 3 then starts to move in the direction of the arrow Z vertically upwardly as shown in FIG. 5.

Figure 6:
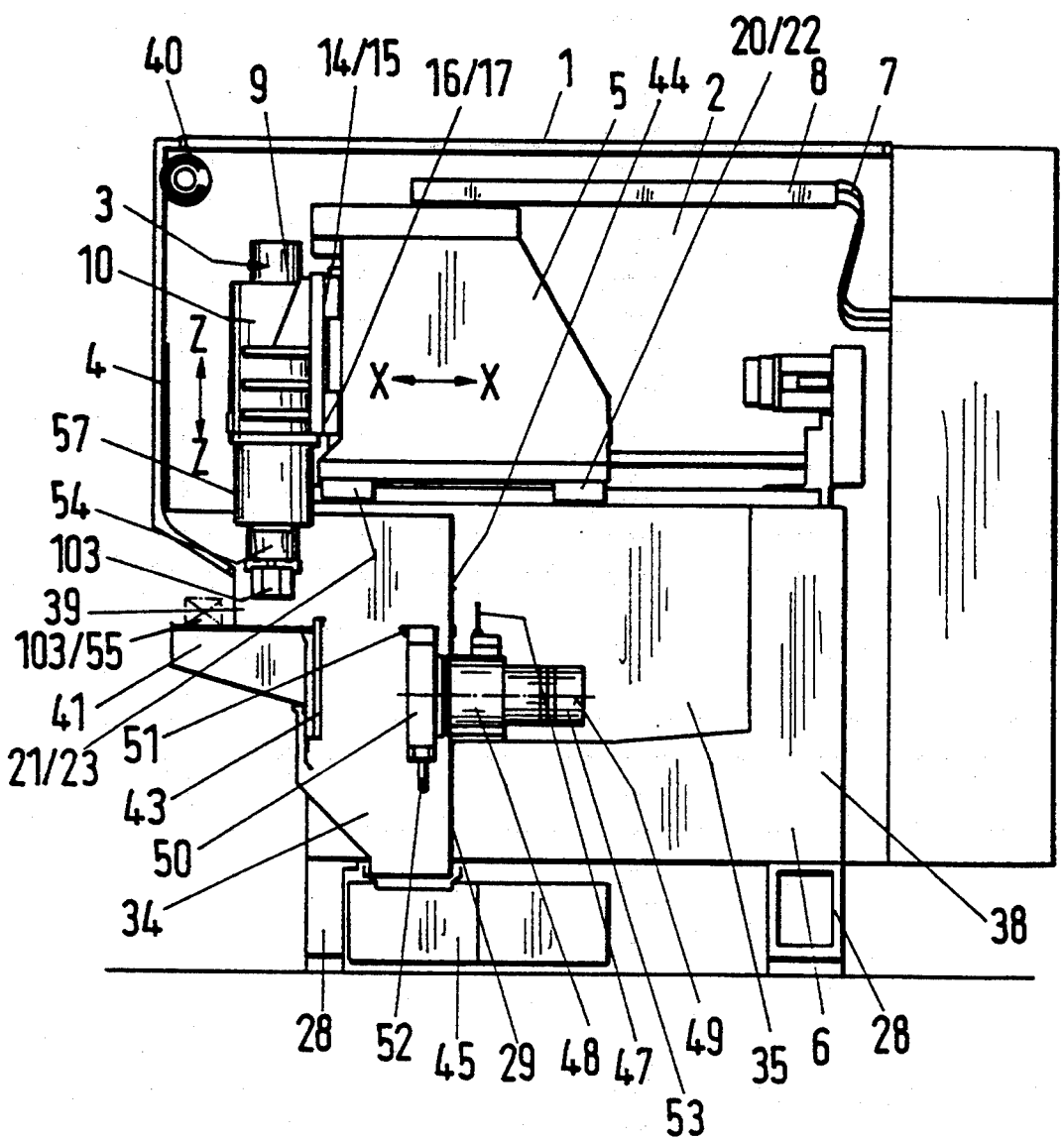
Figure 7:
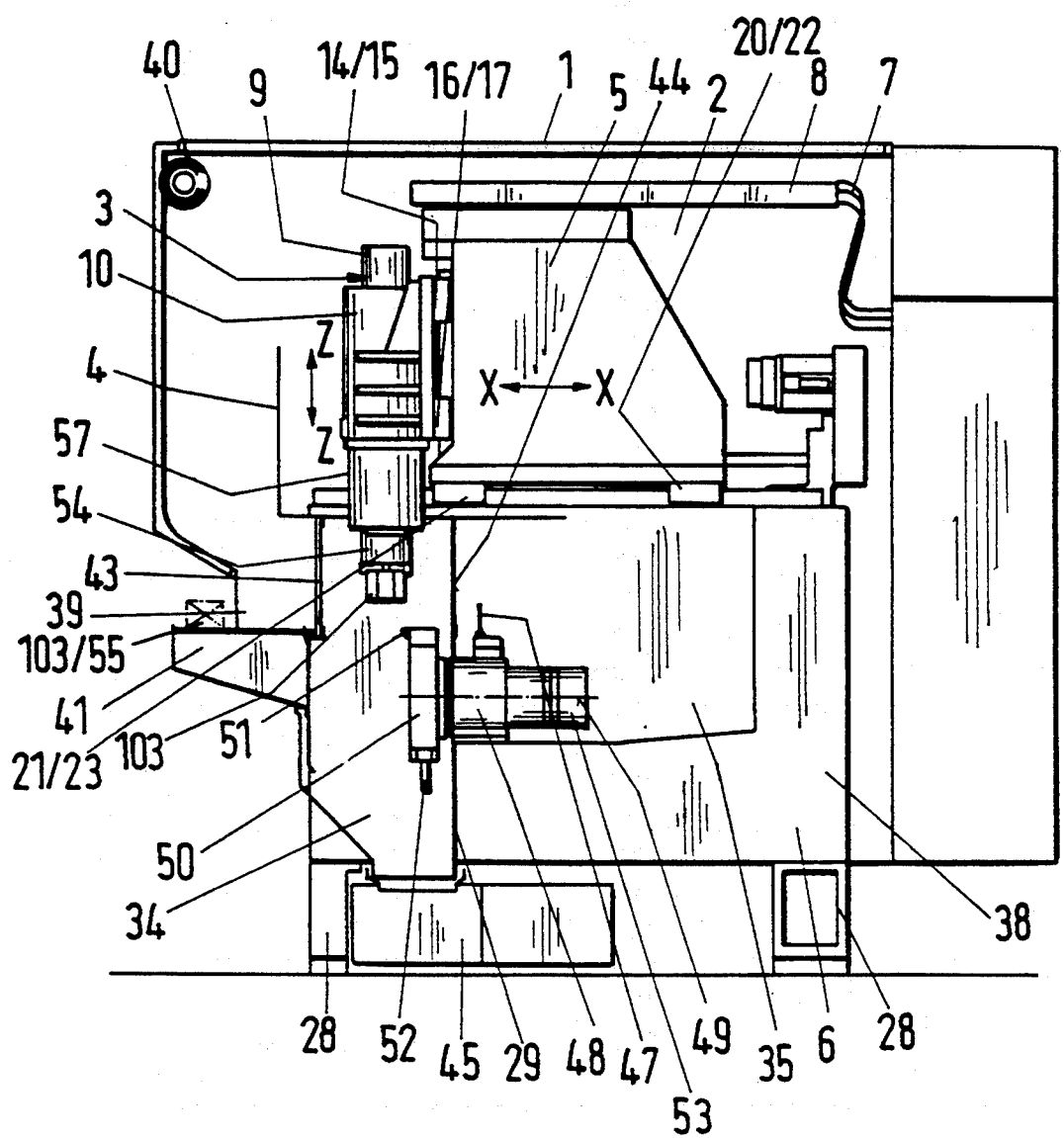
Figure 8:
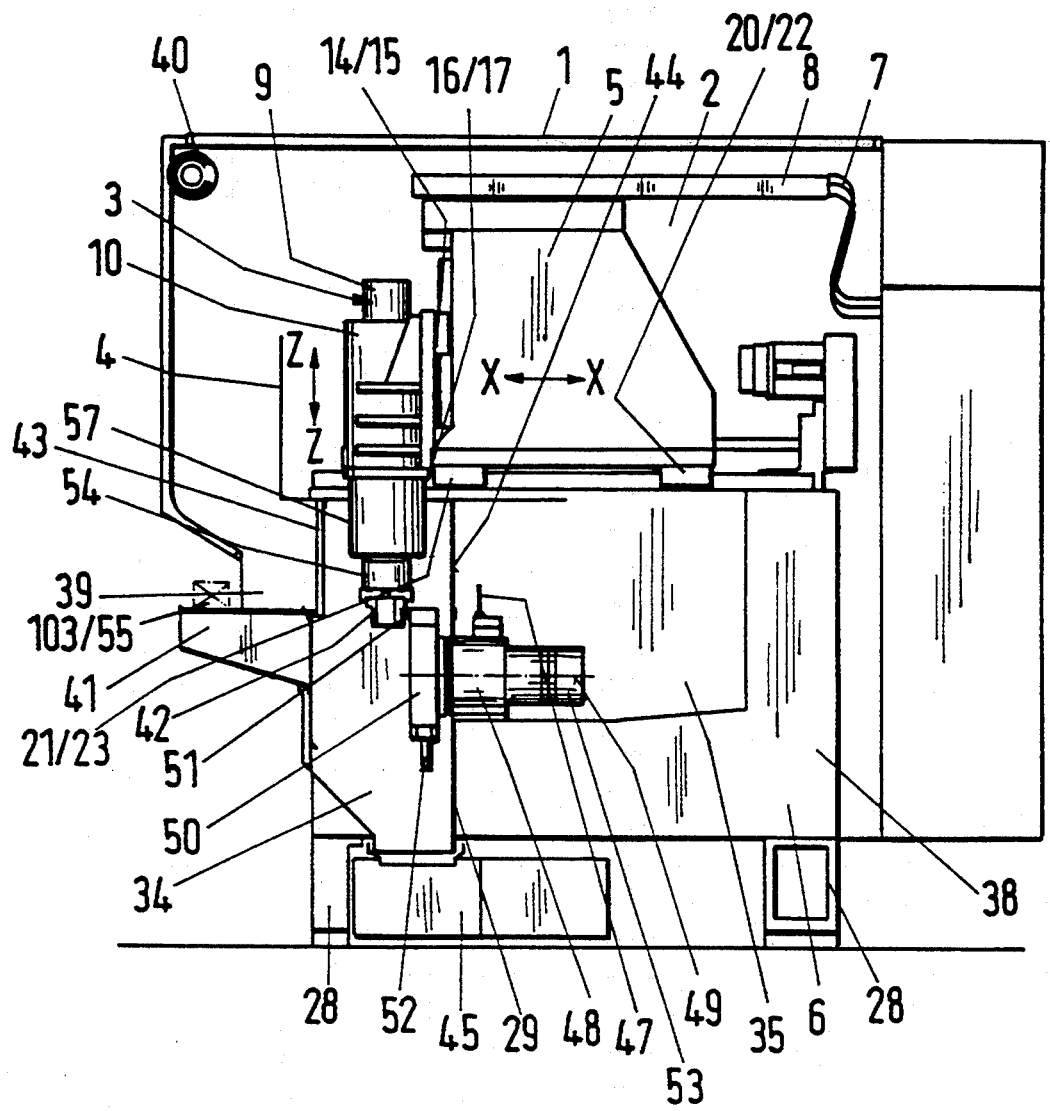
Figure 9:
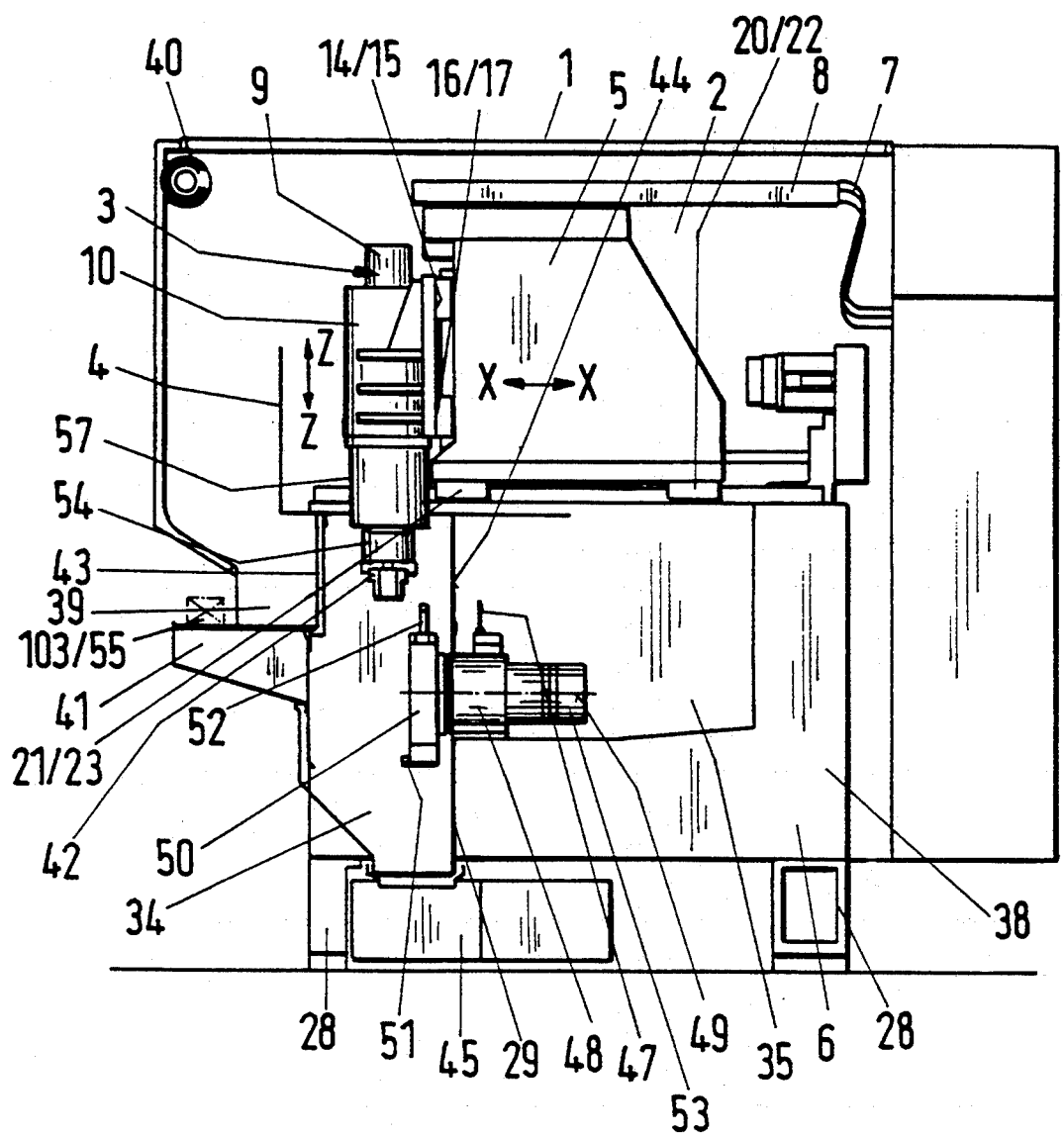

As shown in FIG. 6, after the motor spindle 3 has taken up the workpiece blank 103, traversing takes place in the direction of the arrow X, that is horizontally along the guide rails 24, 25 of the machine base or structure 6, whereby the compound slide 5 only moves far enough until the motor spindle 3 with the picked-up workpiece blank 103 is in the working area 34 (FIG. 7). The door 43 is moved upwardly to the closed position, that is vertically upwardly, and the workpiece 42 is then machined by tool 51 (FIG. 8). Upon completion of this operation, the motor spindle 3 moves in the direction of the arrow Z upwardly (FIG. 9).

Figure 10:
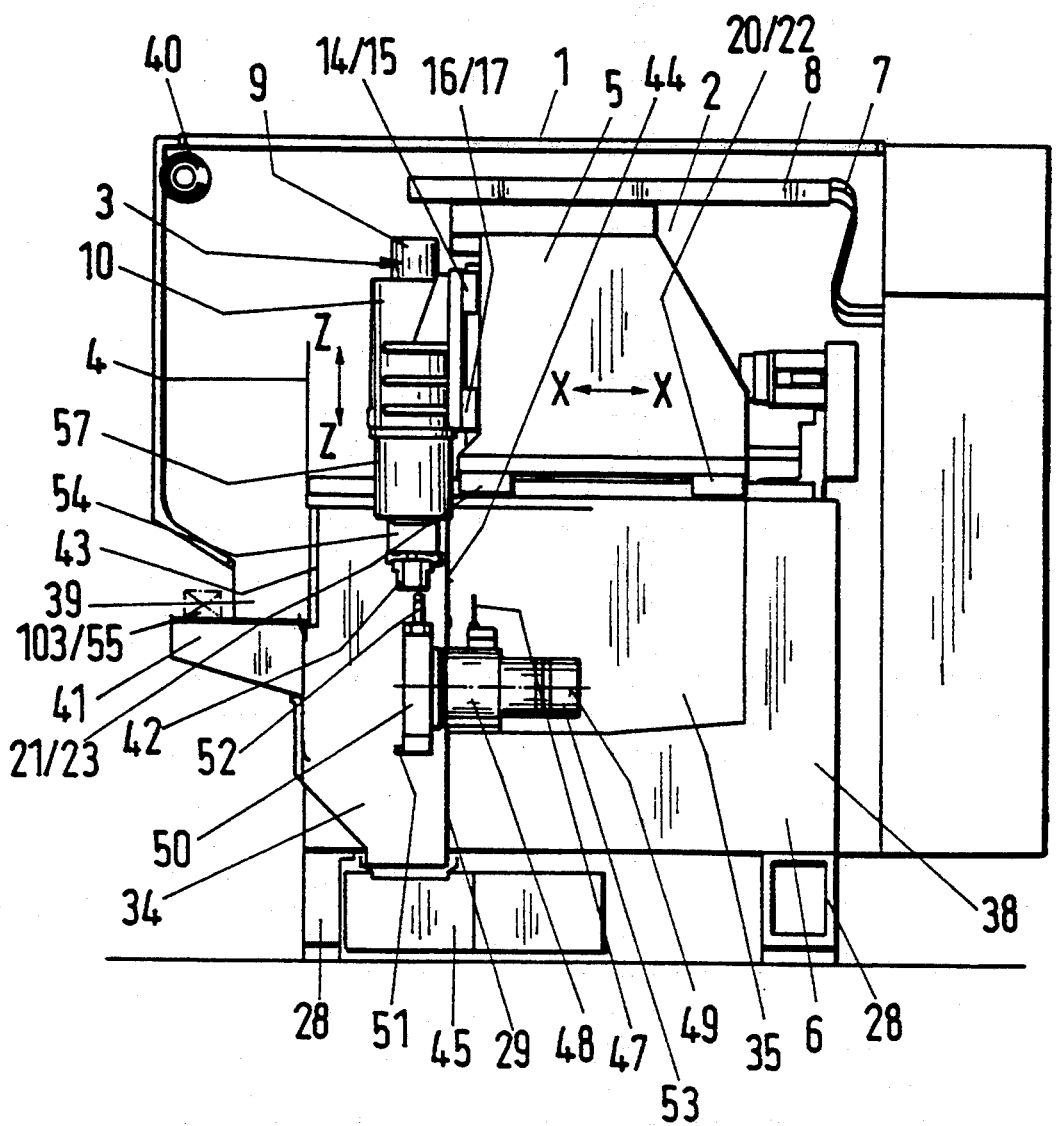

The compound slide 5 is then advanced in the direction of the arrow X as shown in FIG. 10, until the workpiece 42 held by the motor spindle 3 is in a position in which the drill 52, that has been pivoted in the meantime by the turret unit 48 into the machine position (FIG. 9) can begin to operate.

Figure 11:
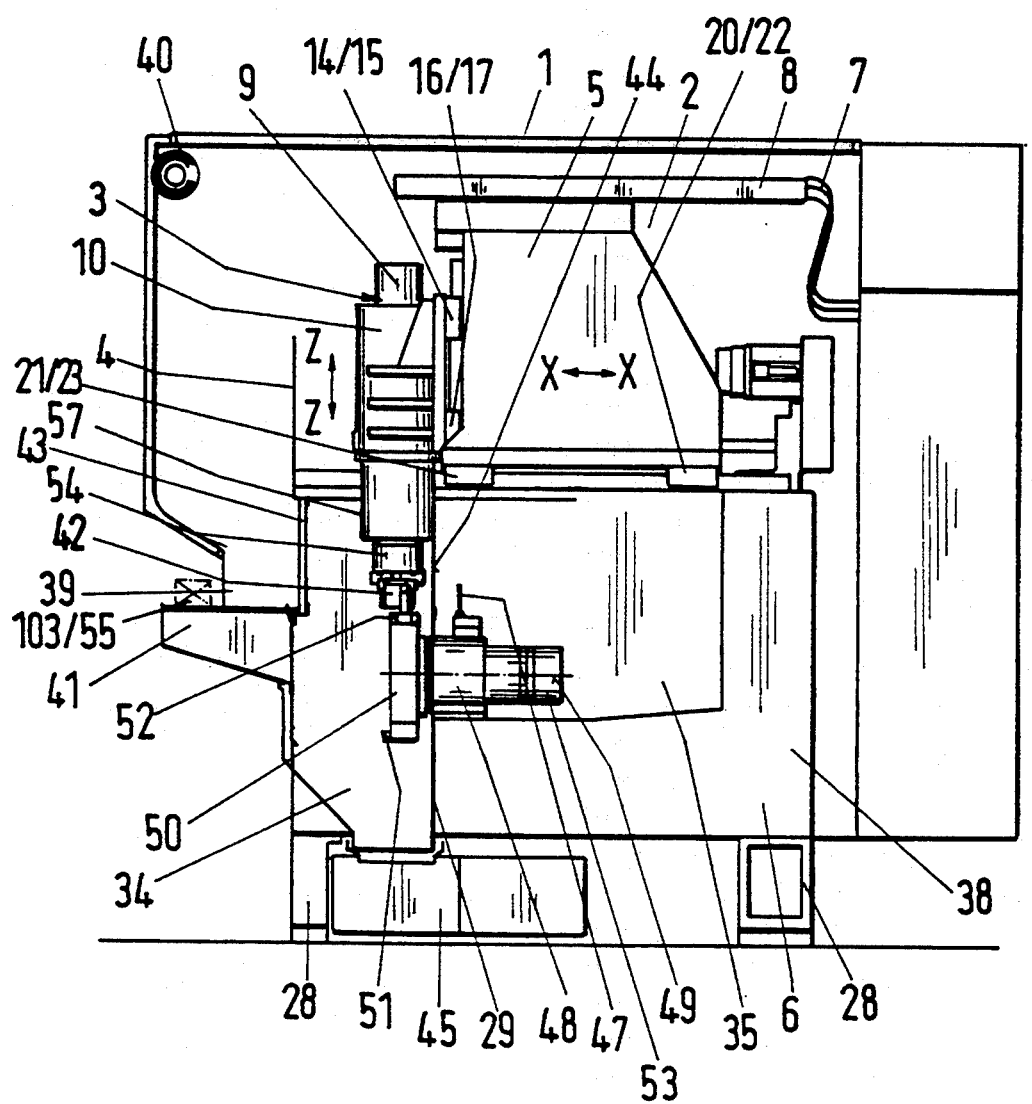

As shown in FIG. 11, the motor spindle 3 moves downwardly in a direction of the arrow Z completing the machining process on the workpiece 42.

Figure 12:
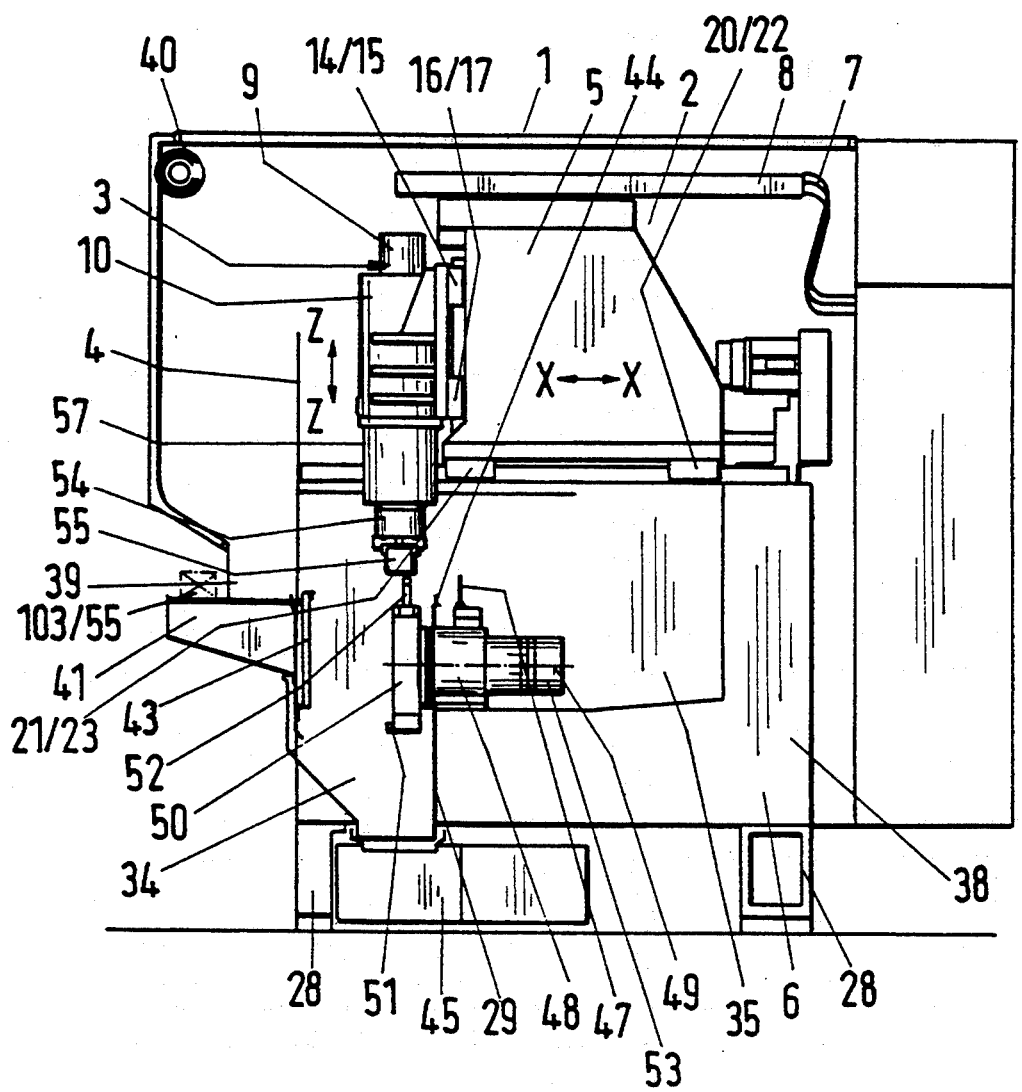
Figure 13:
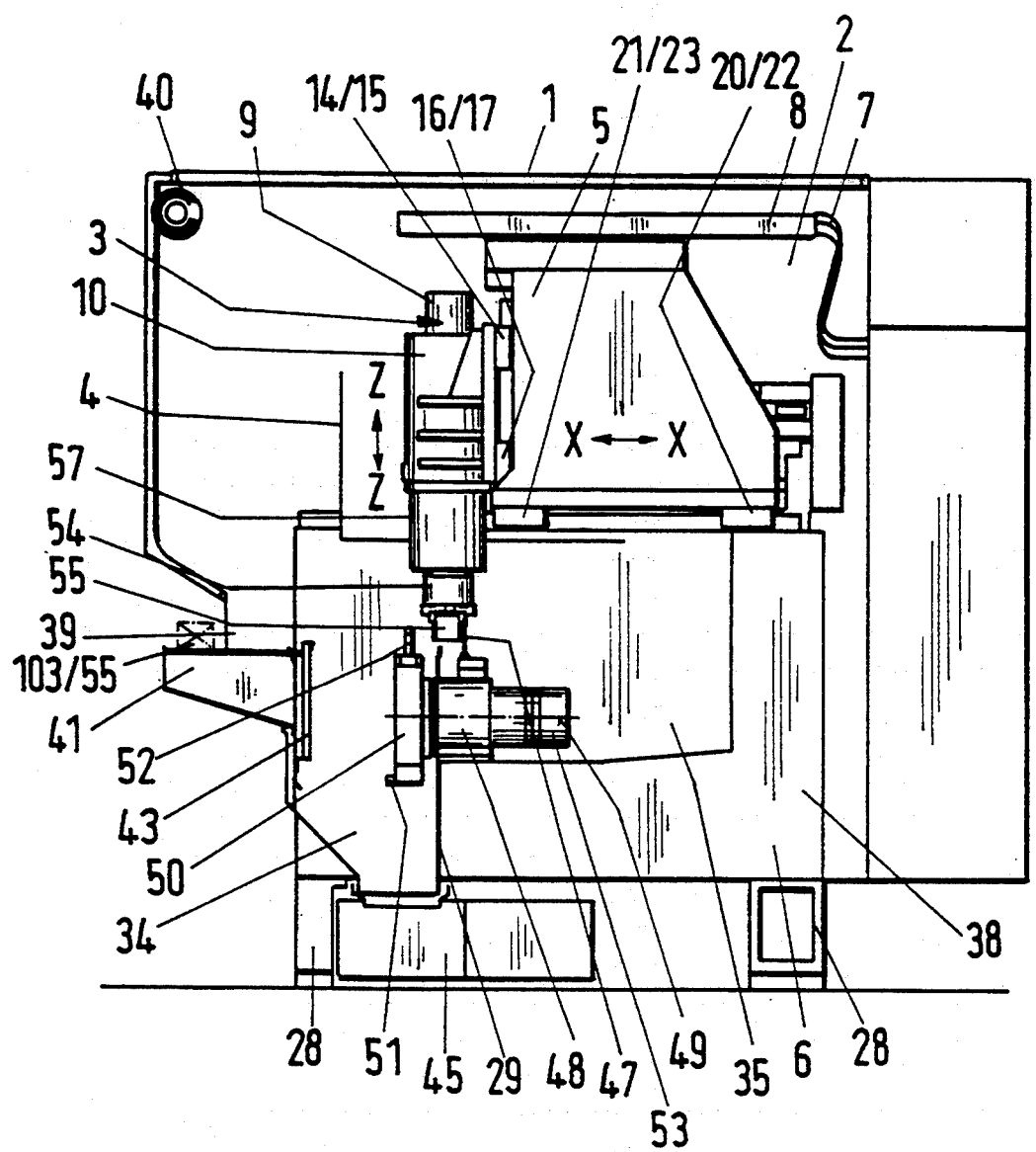
Figure 14:
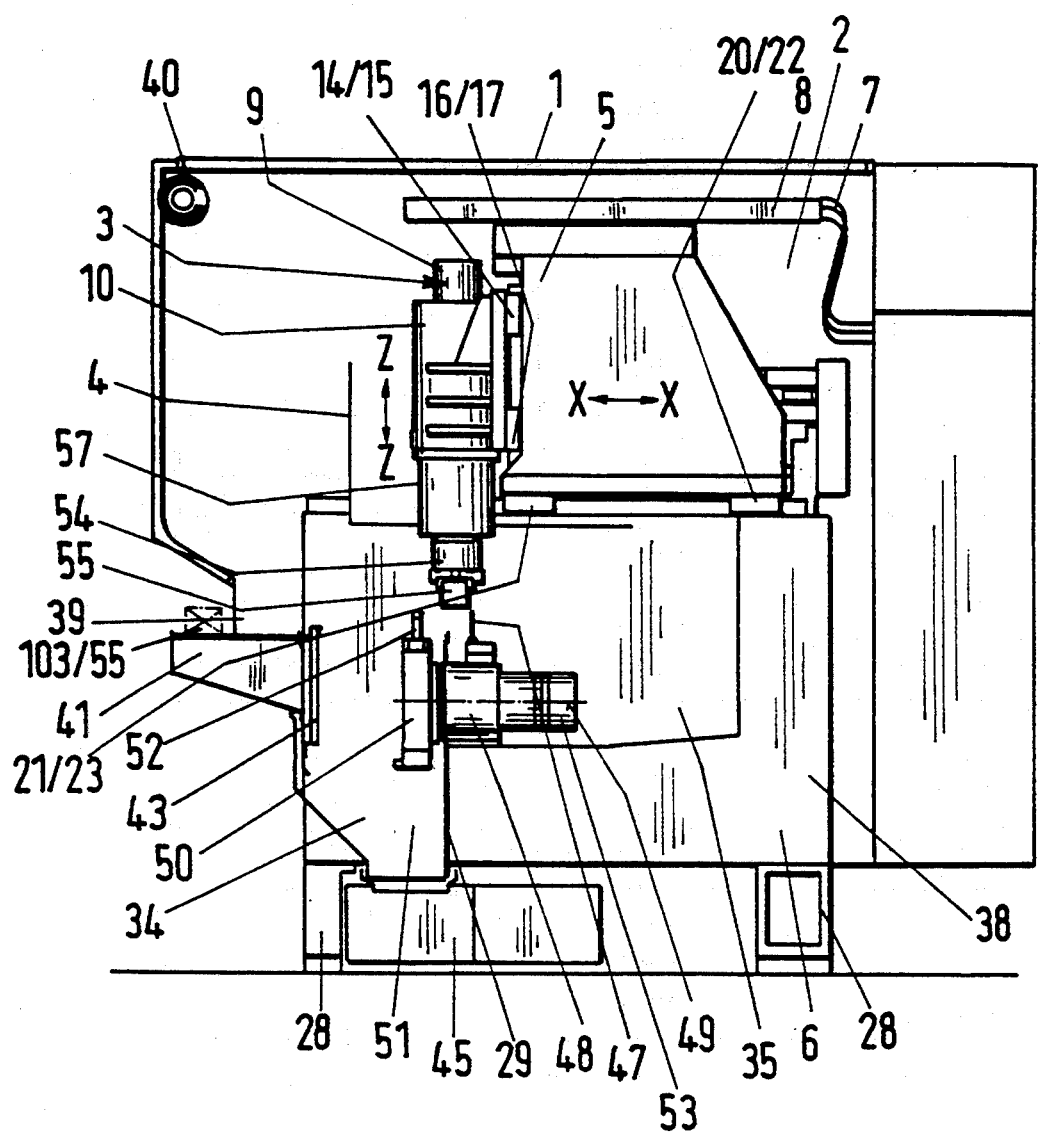

According to FIG. 12, the workpiece spindle is subsequently moved upwardly in the direction of the arrow Z, the door 44 to the measuring zone 35 is completely opened, so that, as shown in FIG. 13, the compound slide 5 with the motor spindle 3 and the workpiece 55 can move towards the measuring probe 47 fitted on the turret unit 48. Several measuring programs can be stored in the CNC control of the machine. It is thus possible to measure immediately after a tool change and it is also possible to measure, during the production of preset components, for example, every tenth or twentieth workpiece.

Figure 15:
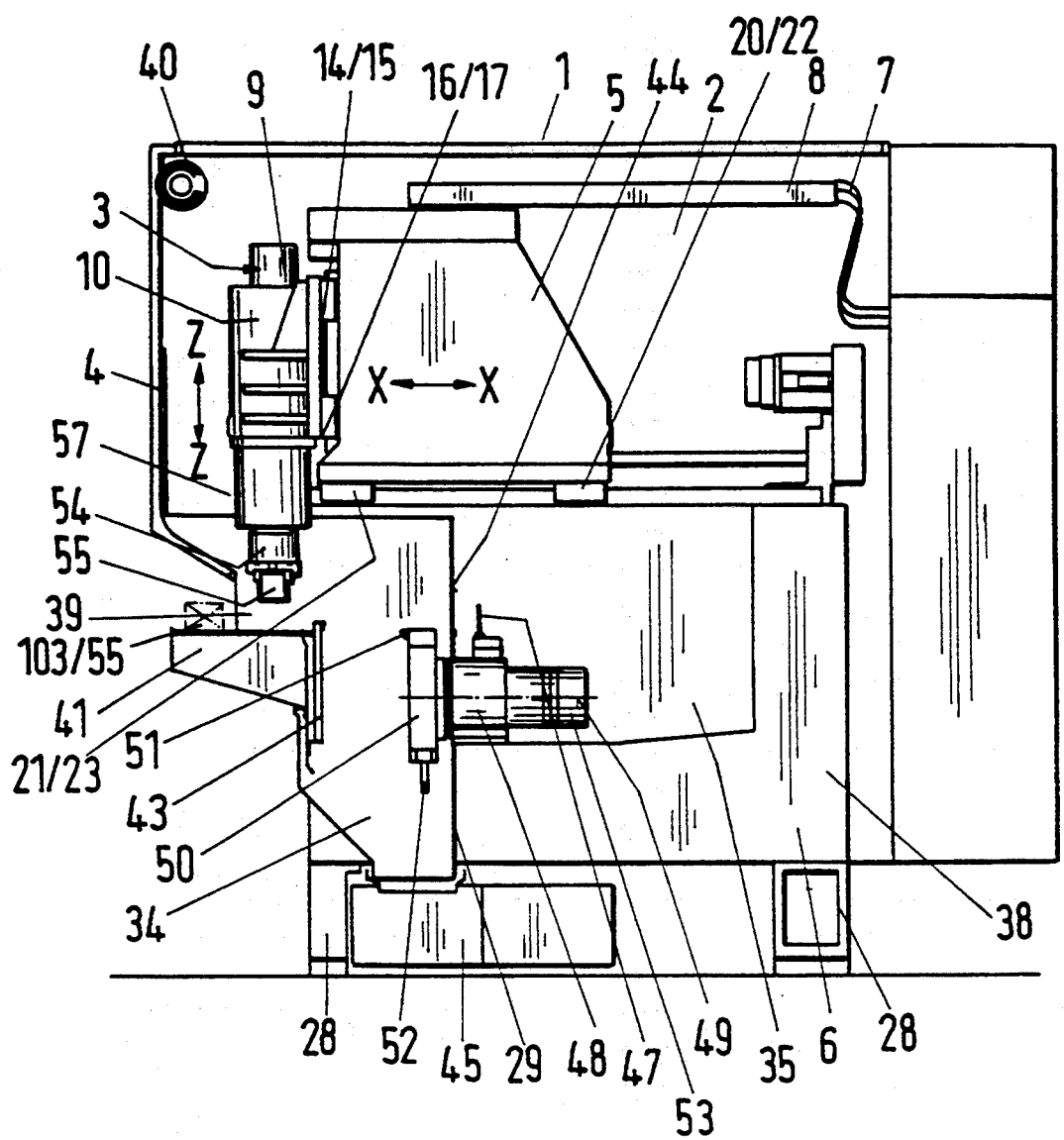
Figure 16:
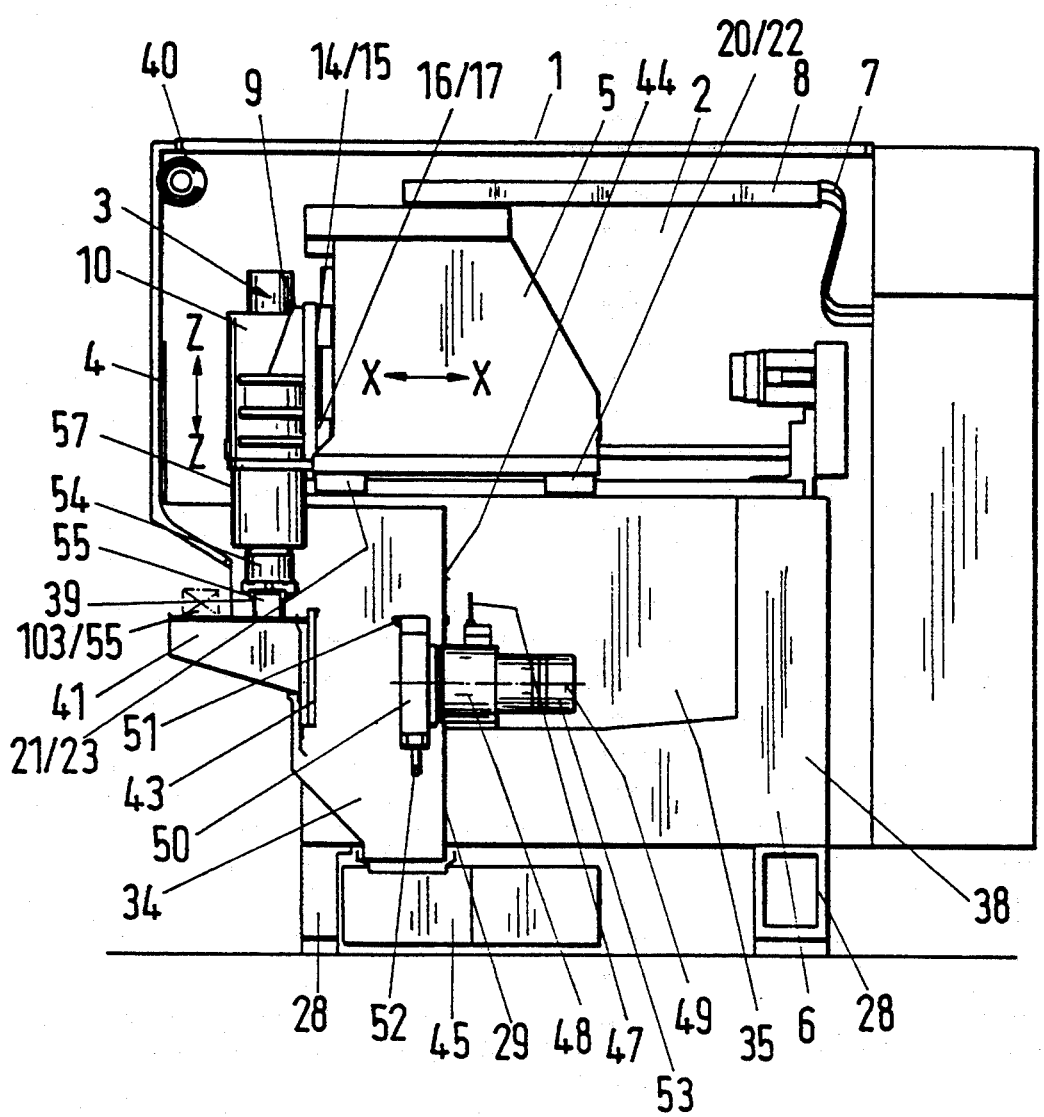
Figure 17:
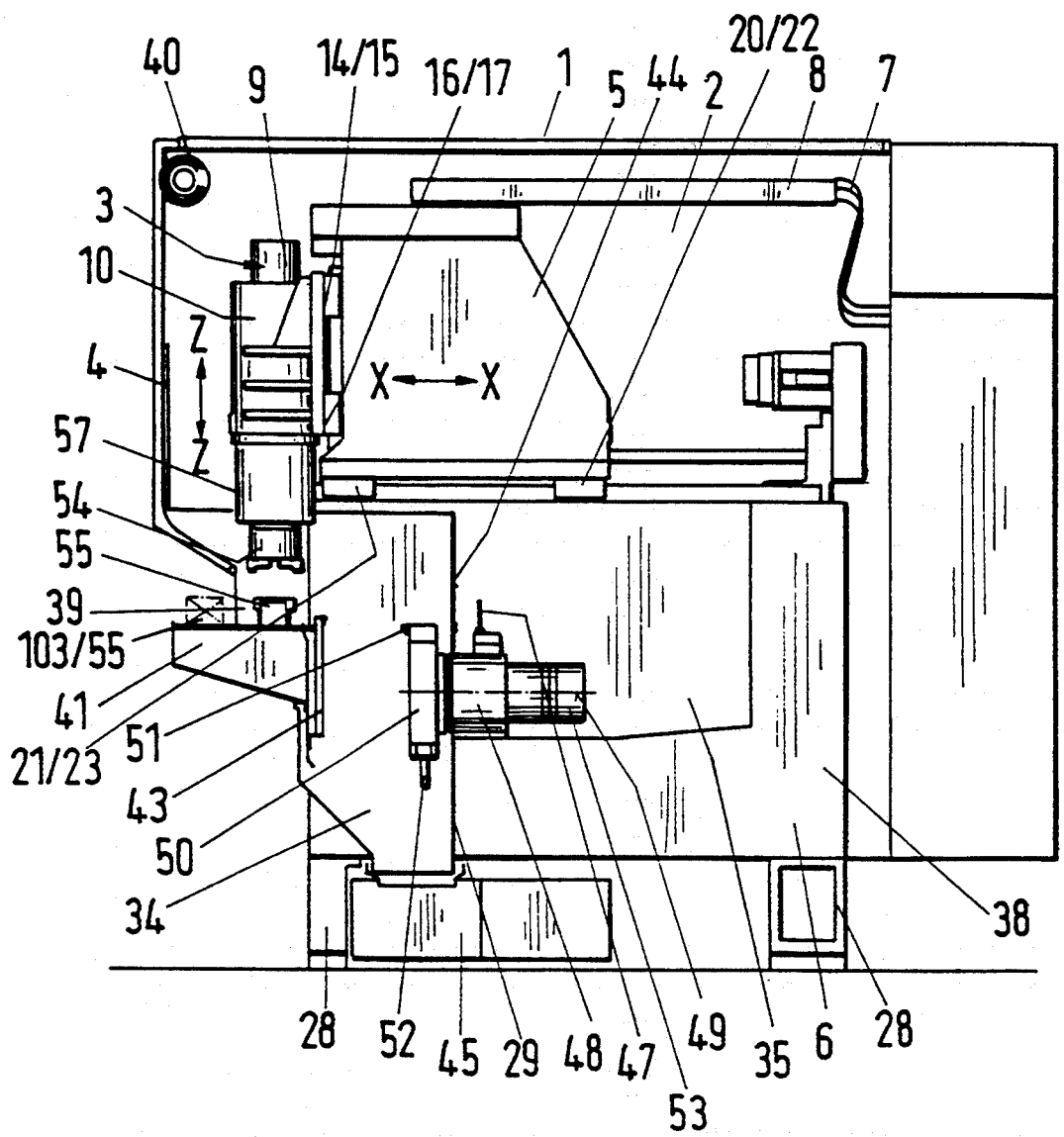

Upon completion of the measuring process, the motor spindle 3 is moved upwardly in the direction of the arrow Z (FIG. 14) and the compound slide is moved forwardly in the direction of the arrow X (FIG. 15). The door 44 that closes the working area 34 from the measuring zone 35 is displaced to its closed position (FIG. 15). The motor spindle 3 is moved downwardly in the direction of the arrow Z as shown in FIG. 16 and deposits the finish-machined workpiece 55 on the storage and conveyor belt 41 and then moves in an upward direction to a position in which, as shown in FIG. 17, it is ready to pick-up a new unmachined workpiece 103, after which the machining cycle can then be repeated.

Due to the fact that the loading and unloading zone 39, the working area 34 and the measuring zone 35 are located in series in the X-direction, a trouble-free machining sequence is produced. The specific separation of the unloading zone 39, the working area 34 and the measuring zone 35 prevents swarf problems during loading and unloading of the respective workpieces 103, 55 or during measurement. The suspended workpieces 103 or 55 contribute toward an optimum swarf outflow.

In order to provide the control outlined hereinabove, path control Siemens 805 T was utilized with an integrated PLC control. The control concept of the machine described in connection with FIGS. 1–17 is designed so that a simple machine control panel is used with the necessary control elements for production.

To retool for a new workpiece, a mobile control panel with a screen (not shown), alphanumeric keyboard (not shown) and soft keys (not shown) are used which are connected to the machine control by means of cables and plugs. This technological approach is far more cost effective where several machines are used than a full blown control panel for each machine. Additionally, the machine operator, not the machine setter, has a much easier time to master control surface for the production sequence.

Preferably, the control panel is provided with a 12" mono screen, with manual input being effected by way of an alphanumeric complete keyboard, restart at the contour, and control support by seven softkeys via softkey menu. Simultaneous conventional traversal along two axes, automatic batch advance to an interruption point, program test run without machine or only in individual axes; NC component program memory (16 k byte); cutting radius compensation; program input simultaneous for program processing; machining cycles; direct circular radius programming; absolute and incremental programming; subroutine technology; parameter technology; 1000 R-parameter; parameter computing; parameter comparison; load function for parameters; trigonometric and arithmetic computation function; input precision of 0.001 mm; safety routines constantly active for measuring circuits, voltage, memory and limit switches; interface diagnosis; alarm texts of NC and machine, respectively, PLC on the screen; display of internal PLC conditions; contour monitoring; and spindle monitoring.

In the example according to FIGS. 18–21, for components with the same function, same reference numerals have been used in FIGS. 1–17. In the example according to FIGS. 18–20, in the side walls 26, 27, designed as guide walls of the machine structure, there are located two tool carriers, that are spaced and in parallel, for stationary tools and rotating tools 59 on a motor driven turret shaft 60. The tool carriers 58, 59 carry on their circumference several tools, of which only stationary tools 61 and rotating tools 62 have been illustrated.

Figure 26:
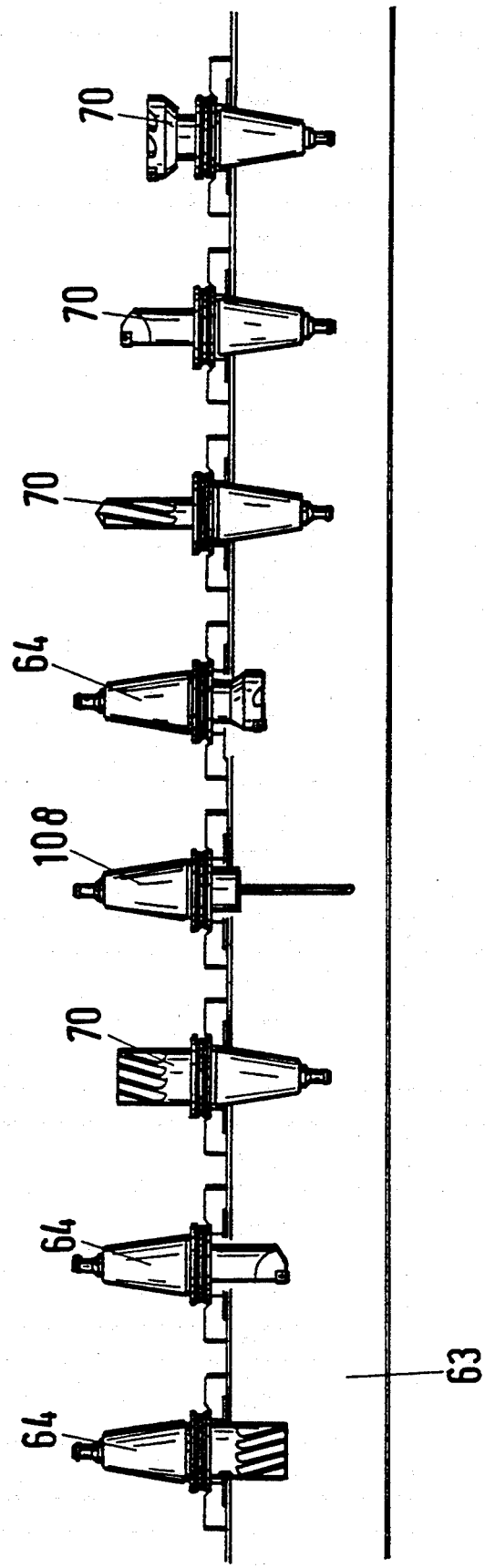
FIG. 26 is a side view of tool pallets equipped with various tools on a prism belt.

In the example according to FIGS. 19 and 20, the machine structure 6 is enclosed in an annular fashion by a tool storage belt 63, on which the various tools 64, 70, are deposited in the ready state with their short taper 64 directed upwardly or downwardly. The tools 64, 70 hang or stand vertically in the tool storage belt 63 (FIG. 26) which can transport the pertinent tools required in a synchronized manner. The tool storage belt 63 is motor driven and is also incorporated in the CNC control of the machine.

The annular shaped tool magazine is enclosed by a storage and conveyor belt 65, which is also motor driven and is also incorporated in the CNC control and on which the workpieces 103 to be machined of the same or differing type and of the finish-machined workpieces 55 are moved in a synchronized manner by the motor drive of the storage and conveyor belt 65. The finish-machined workpieces 55 are transported by, for example, a shifting device (not shown).

The motor spindle 3 receives a workpiece 103 from the storage and conveyor belt 65, whereby the motor spindle 3 executes a stroke in the vertical direction, that is, towards the Z-axis. After picking up the workpiece 103, the motor spindle 3 traverses toward the Z-axis, for example, 160 mm vertically upwardly. The door 43 closing the working area 34 is opened by vertical downward movement so that the motor spindle 3 can execute horizontally a stroke with the compound slide 5 toward the X-axis. In the illustrated example this stroke is, for example, 980 mm. The motor spindle 3 with the compound slide 5 stops in the position 66 for the first setting, when the required machining, for example, drilling a hole by a tool, for example, tool 70, is carried out. After completing the machining process in the first chucking, the headstock unit 3, 5 advances to position 68, in which the semi-finished workpiece 102 is passed on to the clamping device 69. The clamping device 84 can pick-up, for example, the quick release taper of the tool 64, 70. Where the workpiece 102 is held in position 68 by the clamping device 69, an additional machining process takes place by the tool 64 picked up by the clamping device 84.

The tools that are required are collected from the tool magazine 63 and the tools that are not required are deposited in the tool magazine 63 by the motor spindle 3.

Transportation of safety caps (not shown) for the clamping devices that are not required and the removal of the safety caps from the pertinently required clamping device is also accomplished by the motor spindle 3.

After finish-machining, the door 44 to the measuring zone 35 is opened and the headstock unit 3, 5 traverses the tool to the measuring zone 35, where a measuring probe 47 on a movable arm 71 is located.

Figure 21:
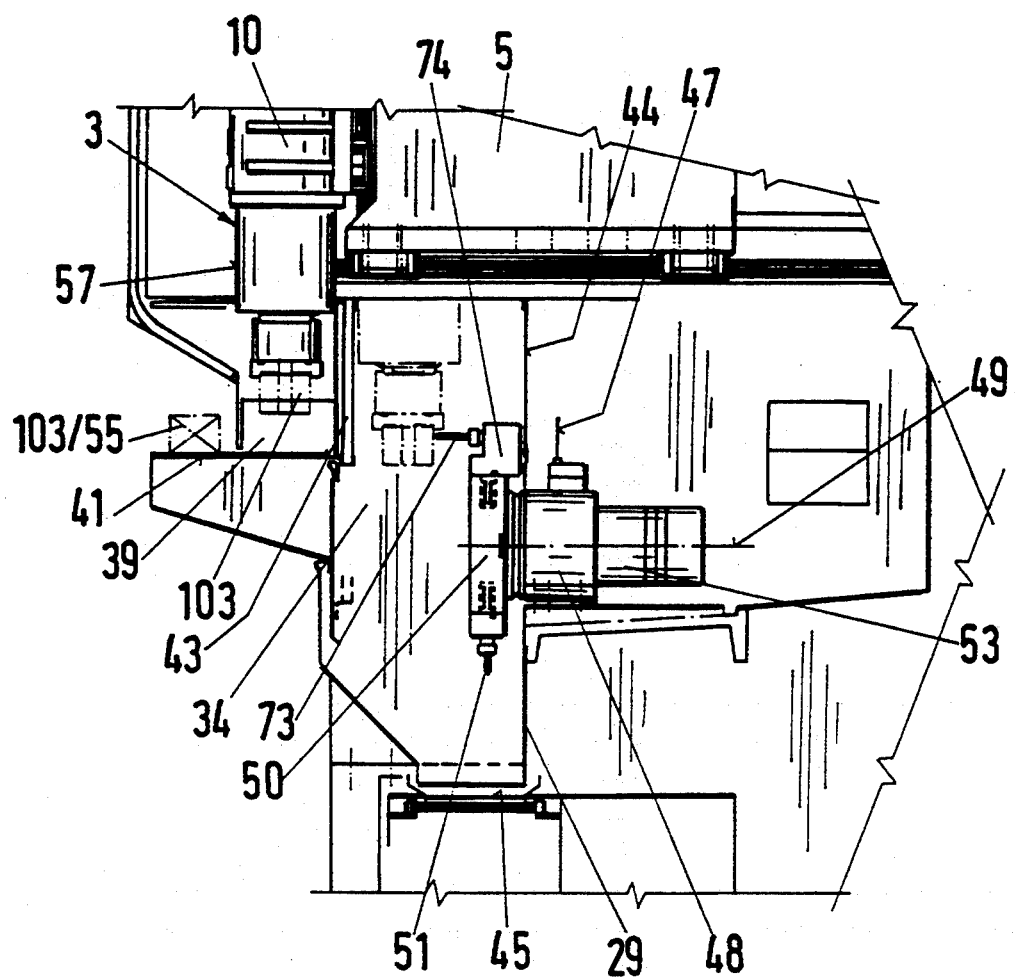
FIG. 21 is a schematic view of a portion of the construction of FIG. 20 whereby a turret is equipped with a driven tool.

Alternatively, as shown in FIG. 21, a turret unit 48 with tools 51, 73 is equipped with its own drive 74 thereby permitting additional machining processes.

Figure 27:
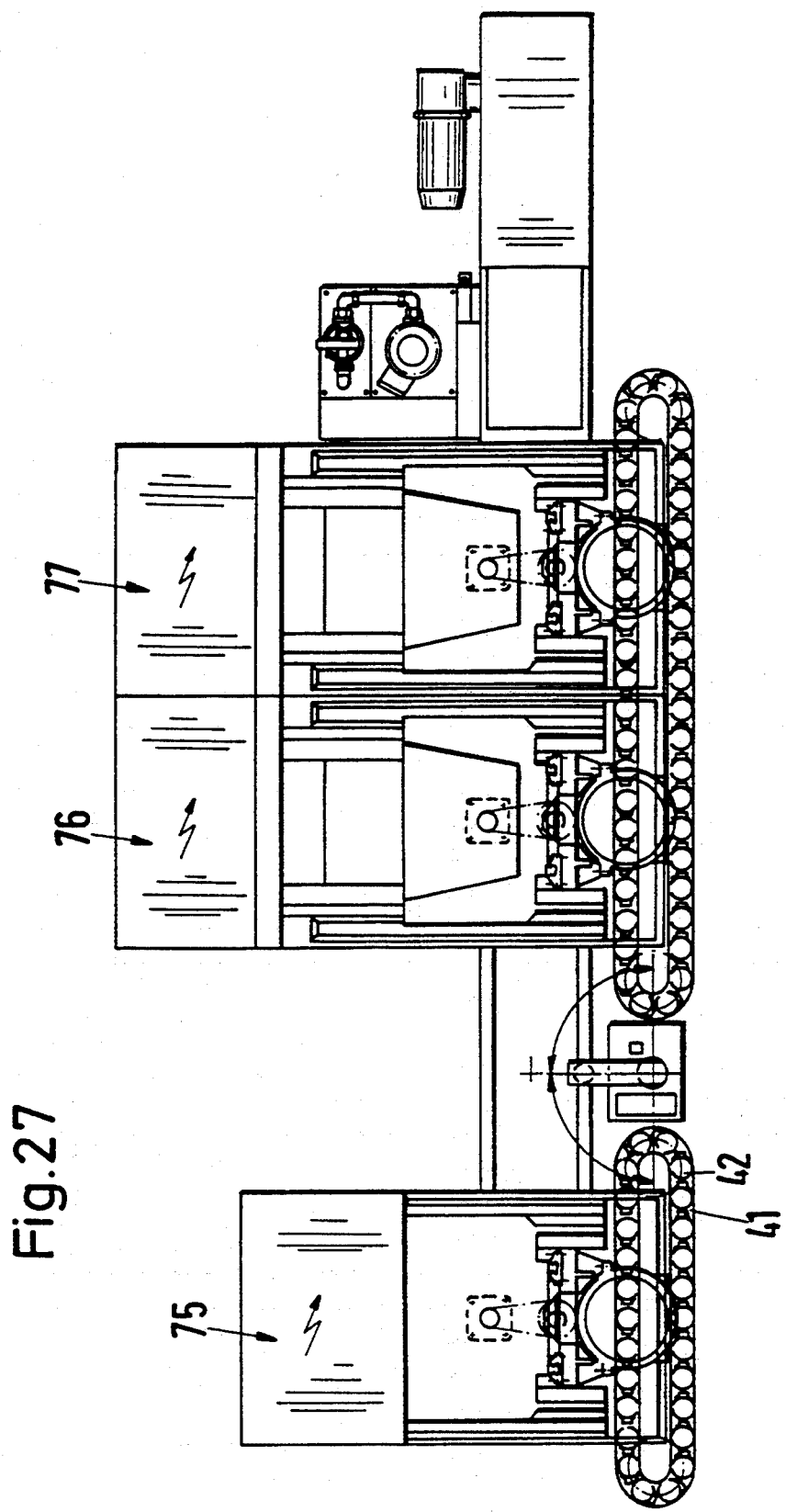
FIG. 27 is a schematic view of a drilling machine and two lathes that have been constructed from kits in accordance with the present invention and assembled to provide a transfer line.

As shown in FIG. 27, an interlinkage of several machines 75, 76, 77 to a single transfer line is possible. Instead of three machines, fewer or many more machines can be interlinked. It is also possible to control the function of all machines by a main frame computer which flexibly controls the workpiece and/or tool supply.

Figure 28:
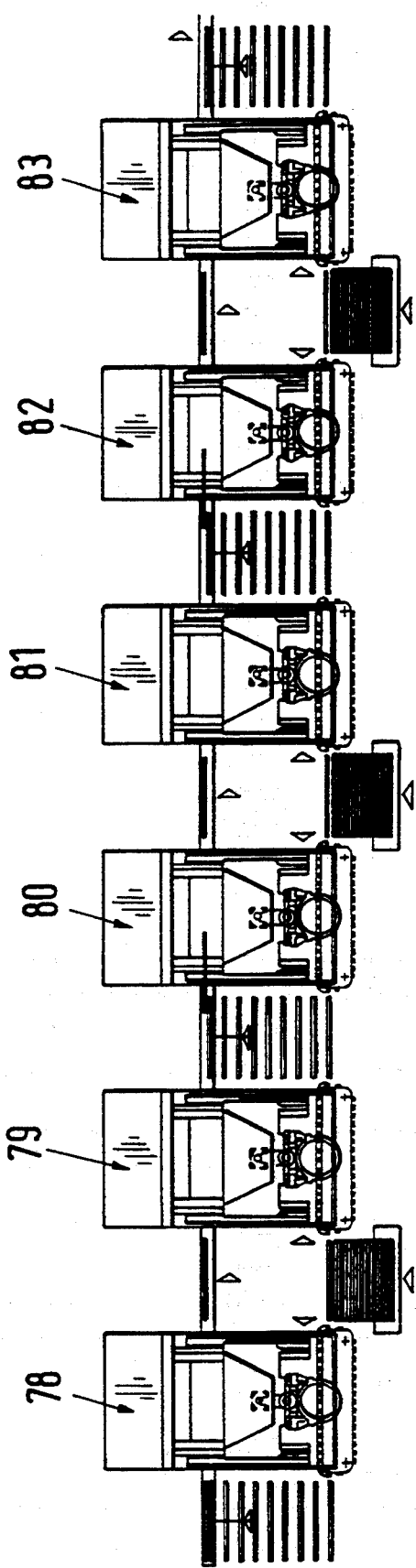
FIG. 28 is a schematic view of several machines assembled to provide a transfer line.

An additional alternative to interlink several individual machines 78, 79, 80, 81, 82 and 83 in one transfer line is shown in FIG. 28. In the arrangement of FIG. 28, the various machines take on different prespecified machining processes and, upon the completion in the respective machines, the component is passed onto the next machine. Transportation can be effected fully automatically by a shifting device.

Figure 24:
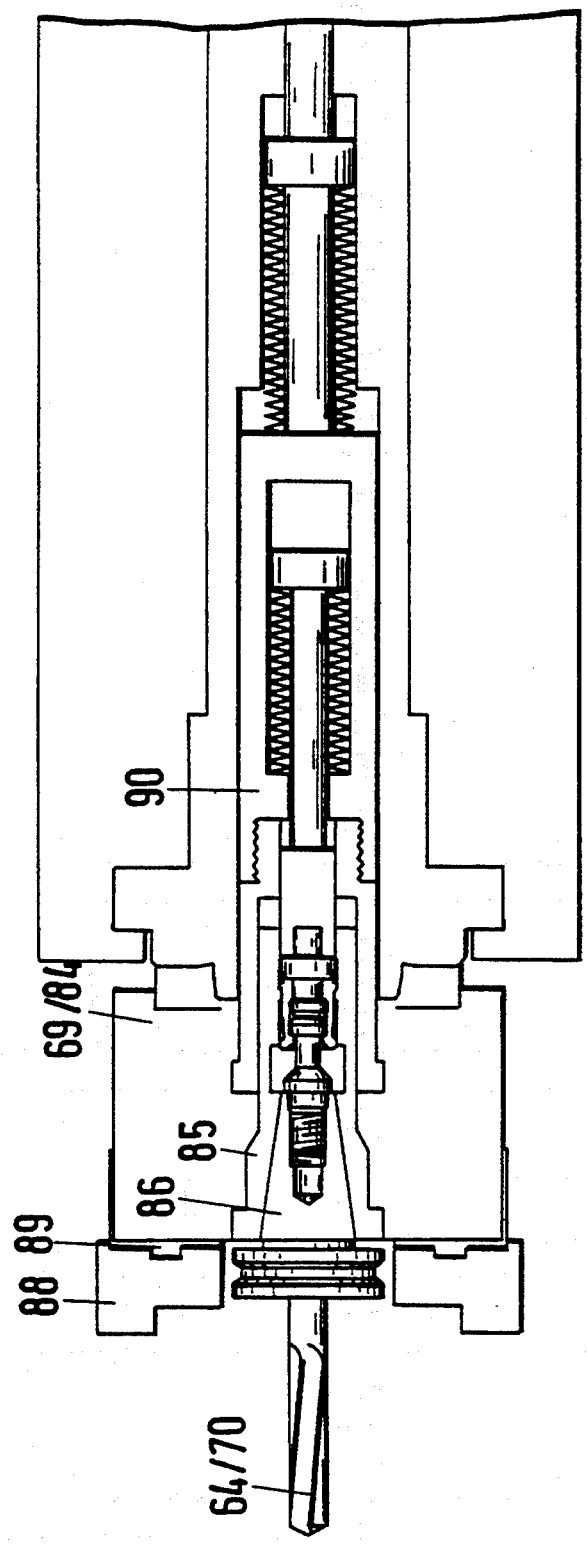
FIG. 24 is a plan view of a portion of a chuck according to the present invention.
Figure 25:
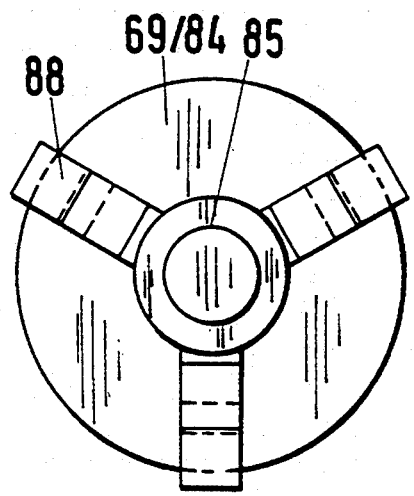
FIG. 25 is a front view of the chuck of FIG. 24.

All clamping devices for workpieces and tools for all examples can be constructed as shown in FIGS. 24 and 25. These are combined clamping devices 69, 84, with a central tool mount 85 for the quick release taper 86 of the suitable tools 64, 70 and jaws 88 fitted on guides 89. By a drawbar 90, where required, both the tool mount 85 as well as the jaws 88 can be actuated. When used as a tool mount, the jaws are covered. The safety caps can be moved and actuated in the specified manner by the pick-up spindle, that is, the motor spindle 3.

In the examples shown in FIGS. 18–21, by a suitable control of the motor spindle 3 and/or the respective turret tool carriers 50, 58, 59, machining processes can be carried out in any angled position in space. For example, it is possible to drill holes in workpieces that run at any angle in the workpiece.

Figure 22:
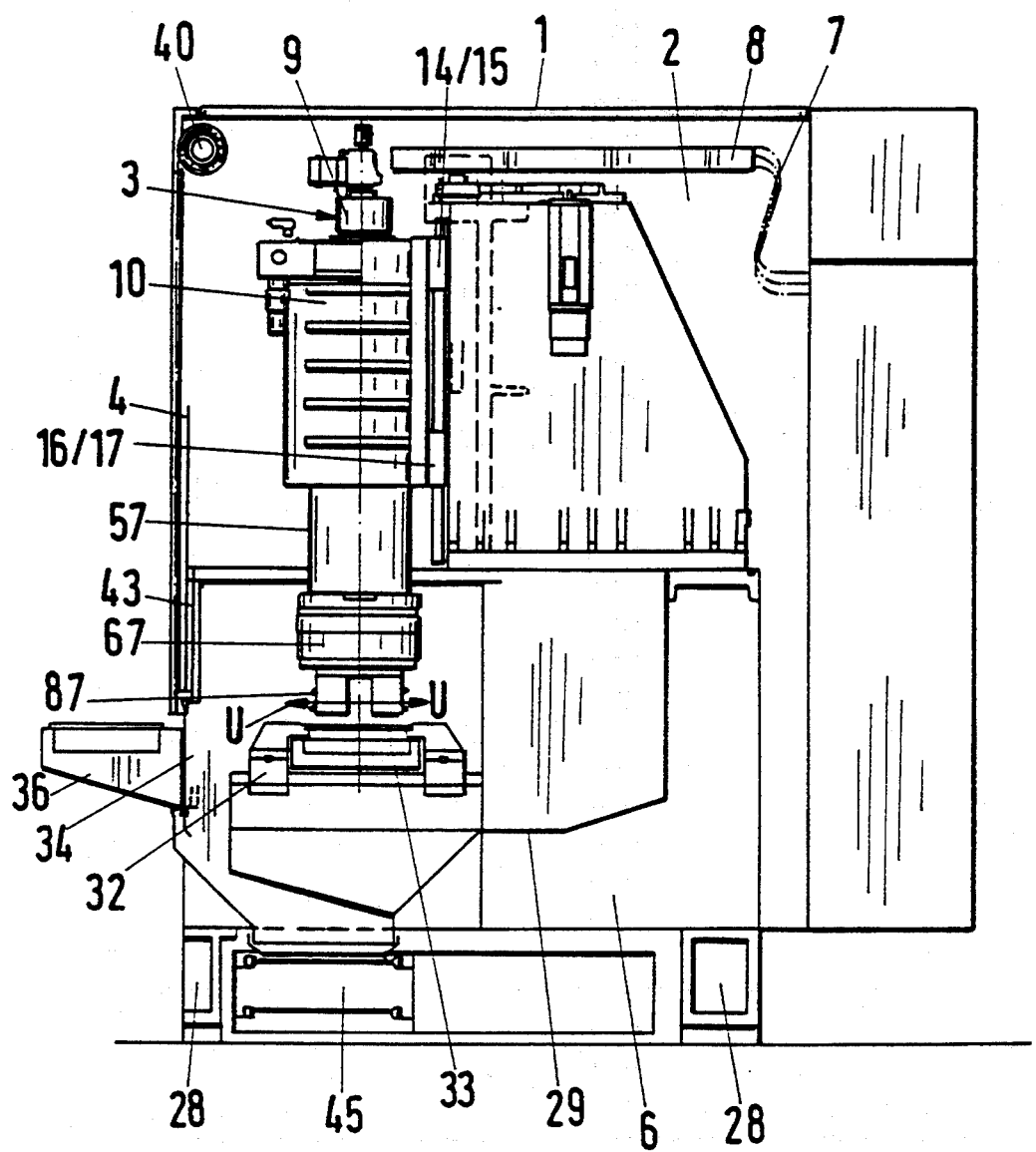
FIG. 22 is a schematic view of the construction of FIG. 4 with a motor spindle being equipped with a CNC facing head.
Figure 23:
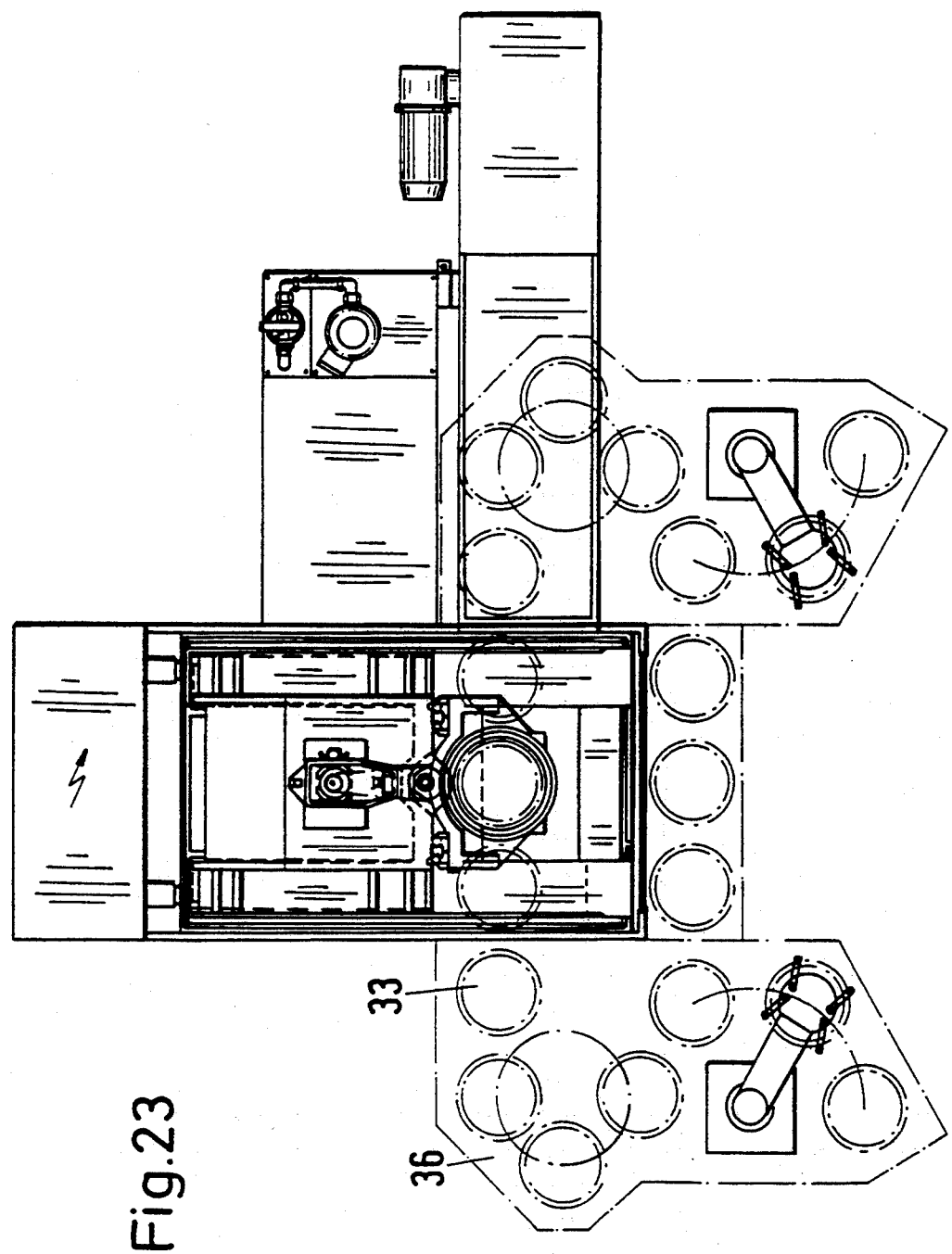
FIG. 23 is a plan view of FIG. 22.

In the example according to FIGS. 22, 23, the motor spindle 3 is equipped with a CNC controlled facing tool 67. This permits additional machining processes. As shown in FIG. 23, the indexing belt 36 transports the workpieces 33 through openings in the machine structure 6 directly to the machining position. They are clamped there, for example, by a central clamping device 32 for subsequent machining by the facing tool 67 with tools 87.

Figure 29:
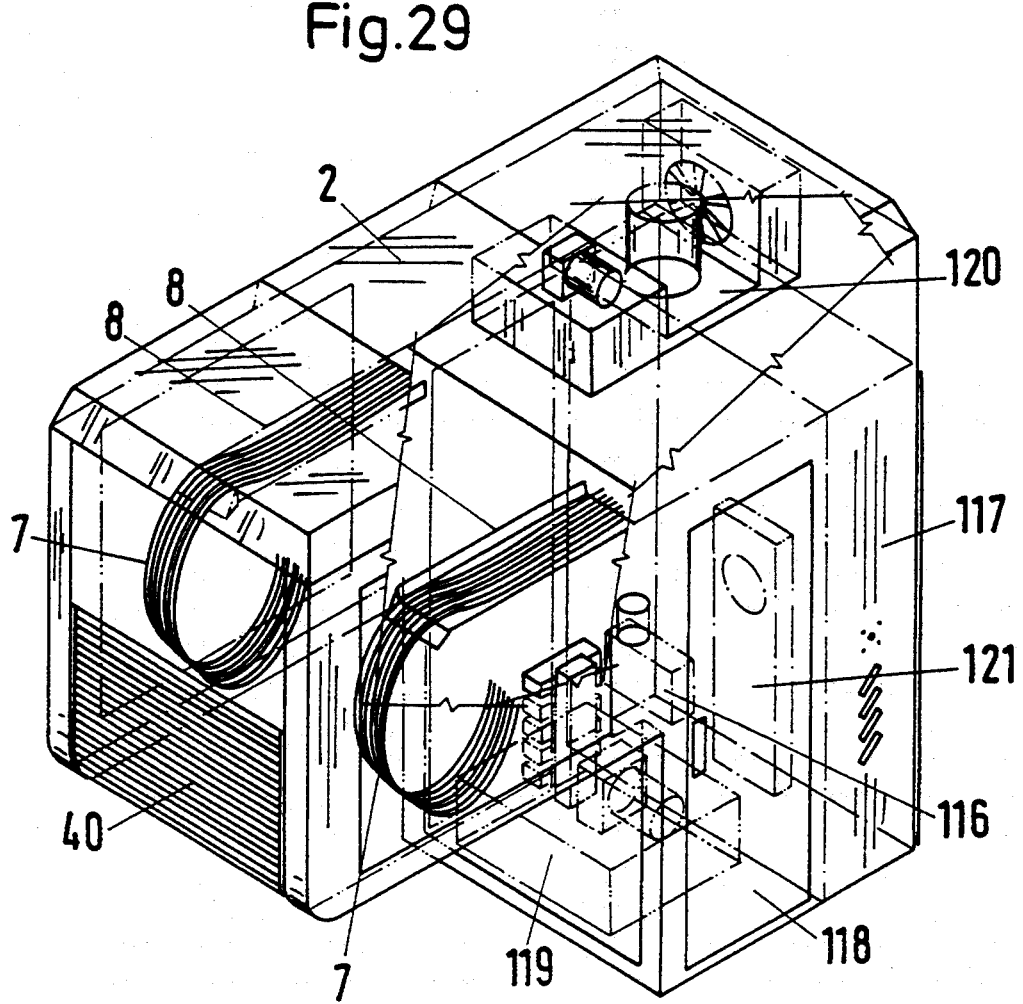
FIG. 29 is a schematic perspective view of a container constructed as a power container in accordance with another embodiment of the present invention.
Figure 30:
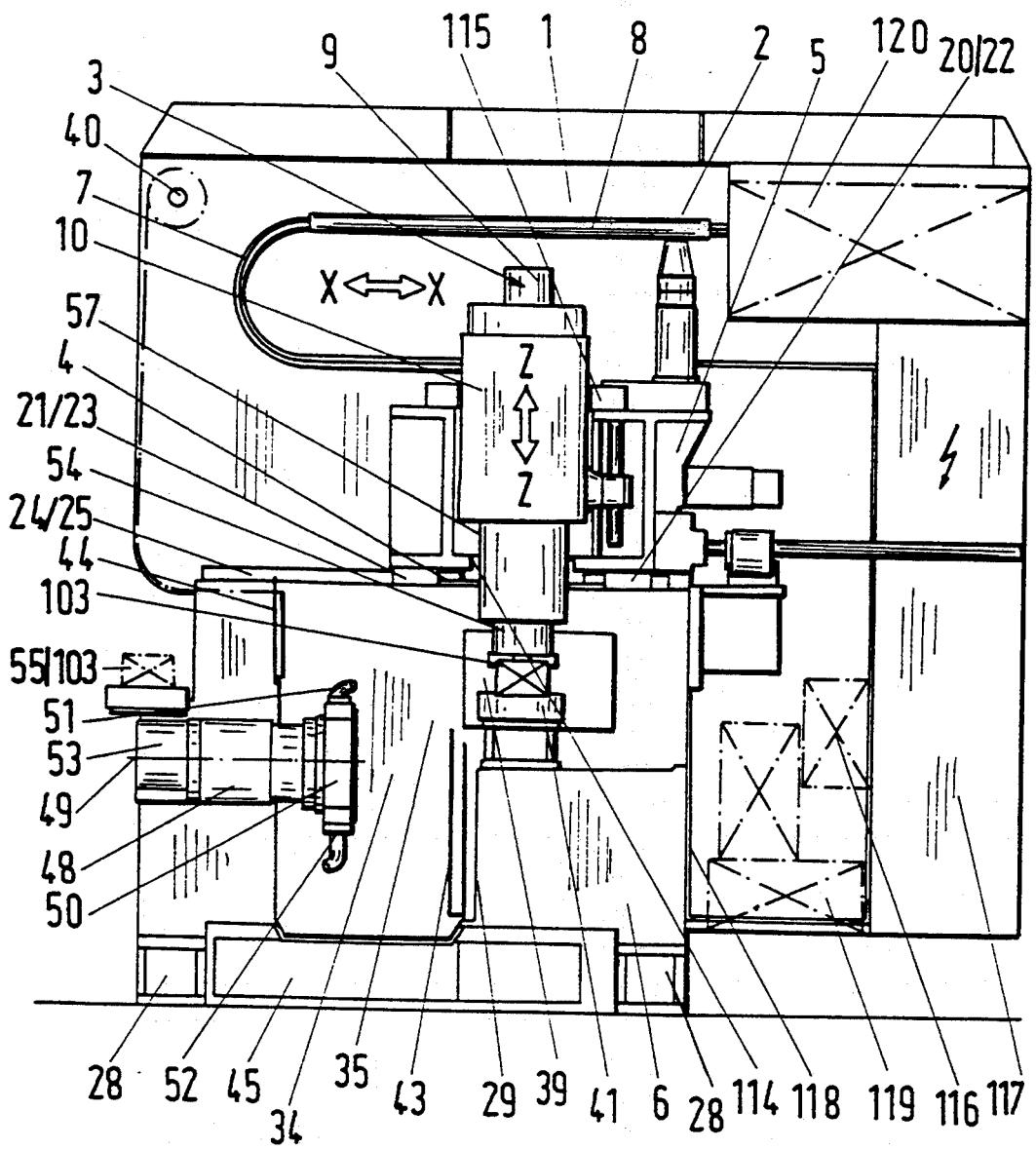
FIG. 30 is a schematic view of a machining center of the present invention in a gripping position for a workpiece.
Figure 31:
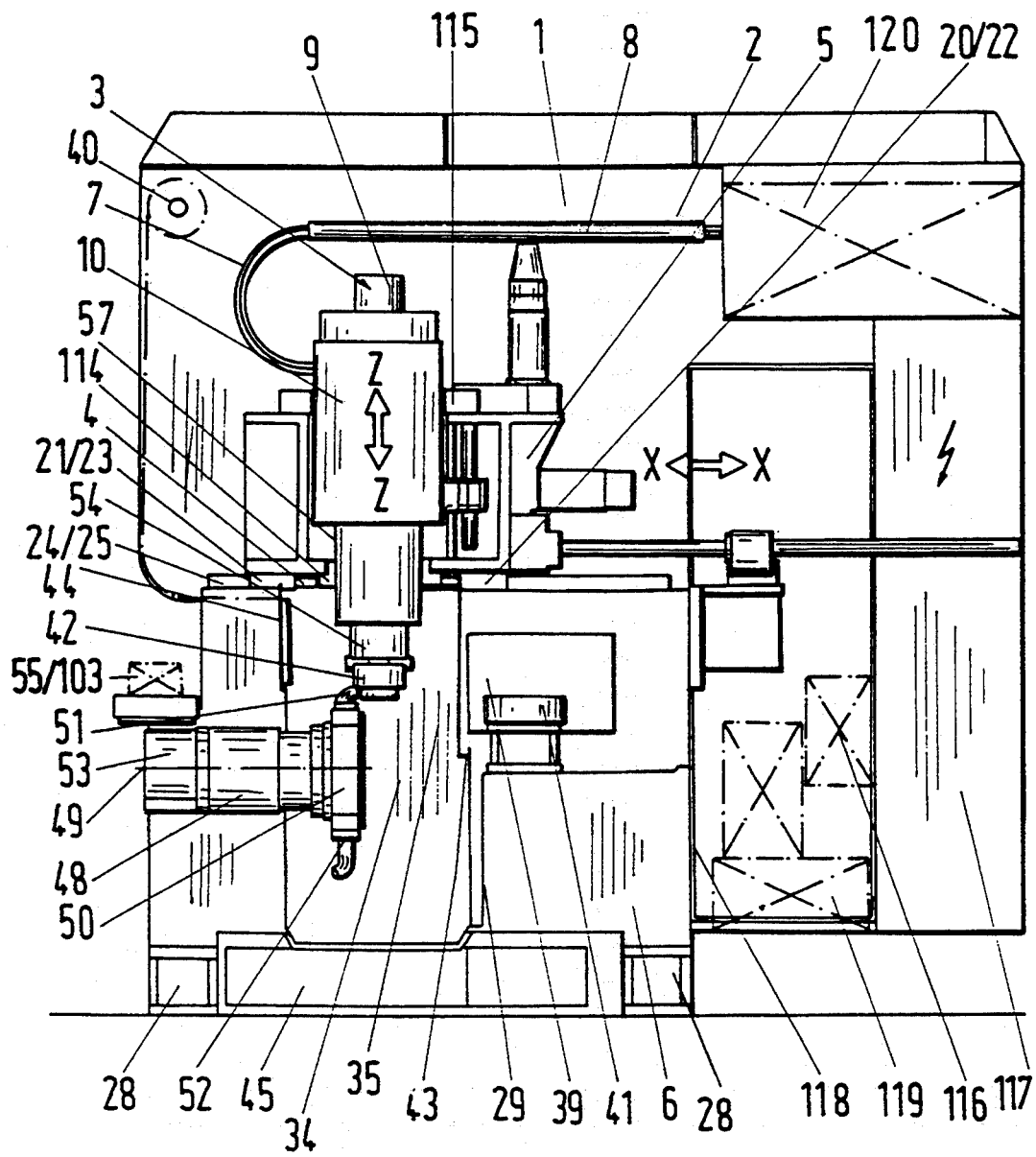
FIG. 31 is a schematic view of a machining position of a motor spindle of the machining center of FIG. 30.

As shown in FIG. 29, the container designed as power container contains suitable electrical equipment 117, an hydraulic power pack 119, central cooling system 120, central lubrication system 116 with pump, oil tanks and hoses as well as a heat exchanger for the control cabinet 121 as well as the ready to connect wiring and piping where necessary, with plug contacts. The container of FIG. 29 has an approximately L-shape in the sideview and has at least one door 118 through which the inside of the L-side of the container is accessible so as to, for example, maintain the equipment and components located therein. This permits the container to be fully installed spatially and independent of any time constraints from the other mechanical assemblies, so that it can be taken and attached to the other components of the machine as a totally movable unit.

As shown in FIGS. 30–34, the turret 48 with tool carrier 50 is located on the operating side, that is, on the side where the operator is normally located. This provides a good view of the tool cutting edge and easy exchange of the tools.

The motor spindle 3 is centrally located in the compound slide 5 and is moved in a hydrostatic guide 114, 115 in the vertical direction. Due to the central arrangement, which means that stress and temperature, a high rigidity and temperature stability is obtained. The hydrostatic guide 114, 115 produces good damping properties and an improved production quality.

The loading and unloading zone 39 is located behind the working area 34 inside of the machining center. The disposition of the unloading zone 39 and working area 34 noticeably reduces the loading and unloading time.

The storage and conveyor belt 41 is installed through openings 30 (FIG. 2) in the rear section or sector of the machine structure 6 in the loading and unloading zone 39 in the machining center.

Figure 32:
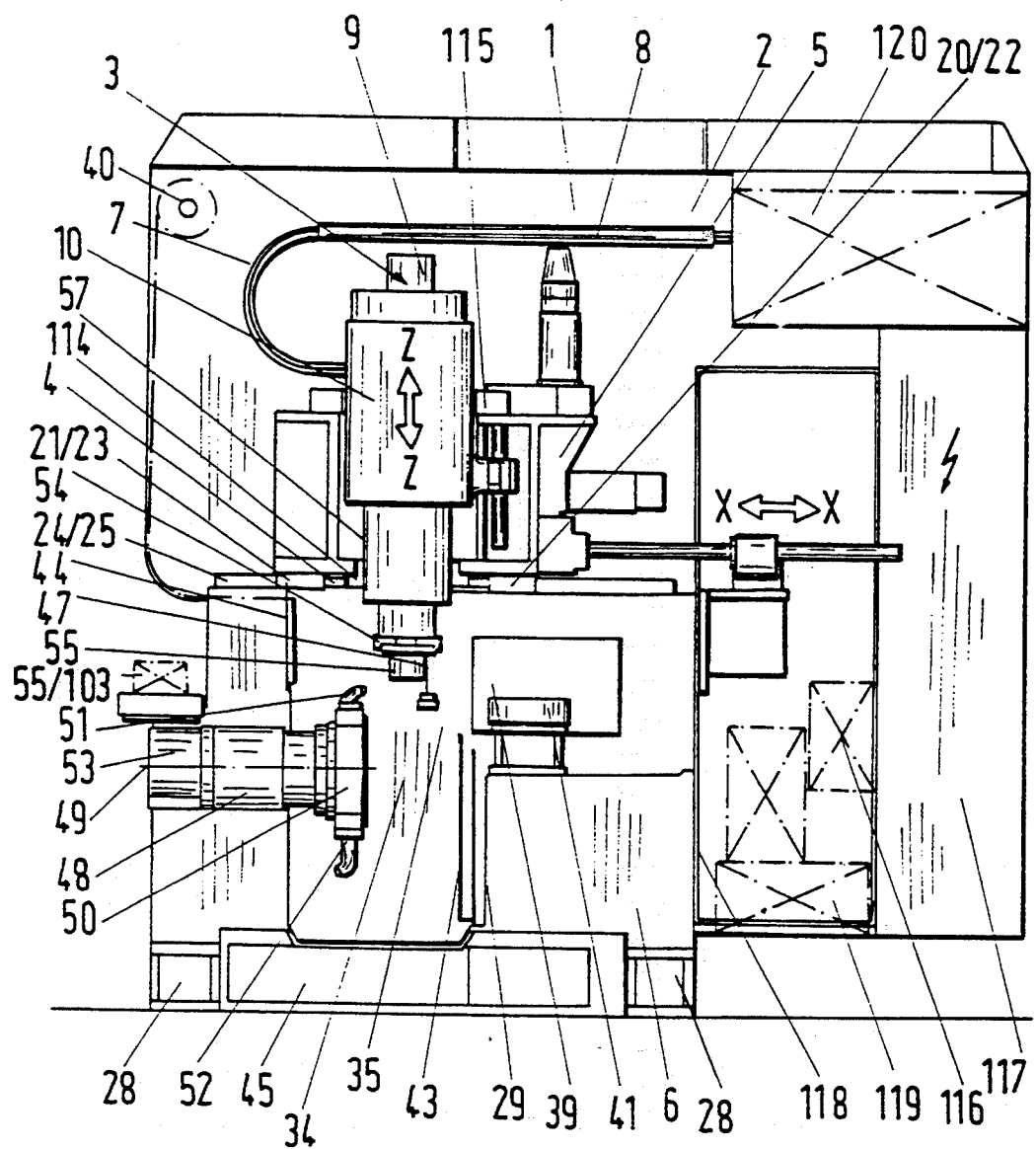
FIG. 32 is a schematic view depicting a measurement of a workpiece on the machining center of FIGS. 30 and 31.
Figure 33:
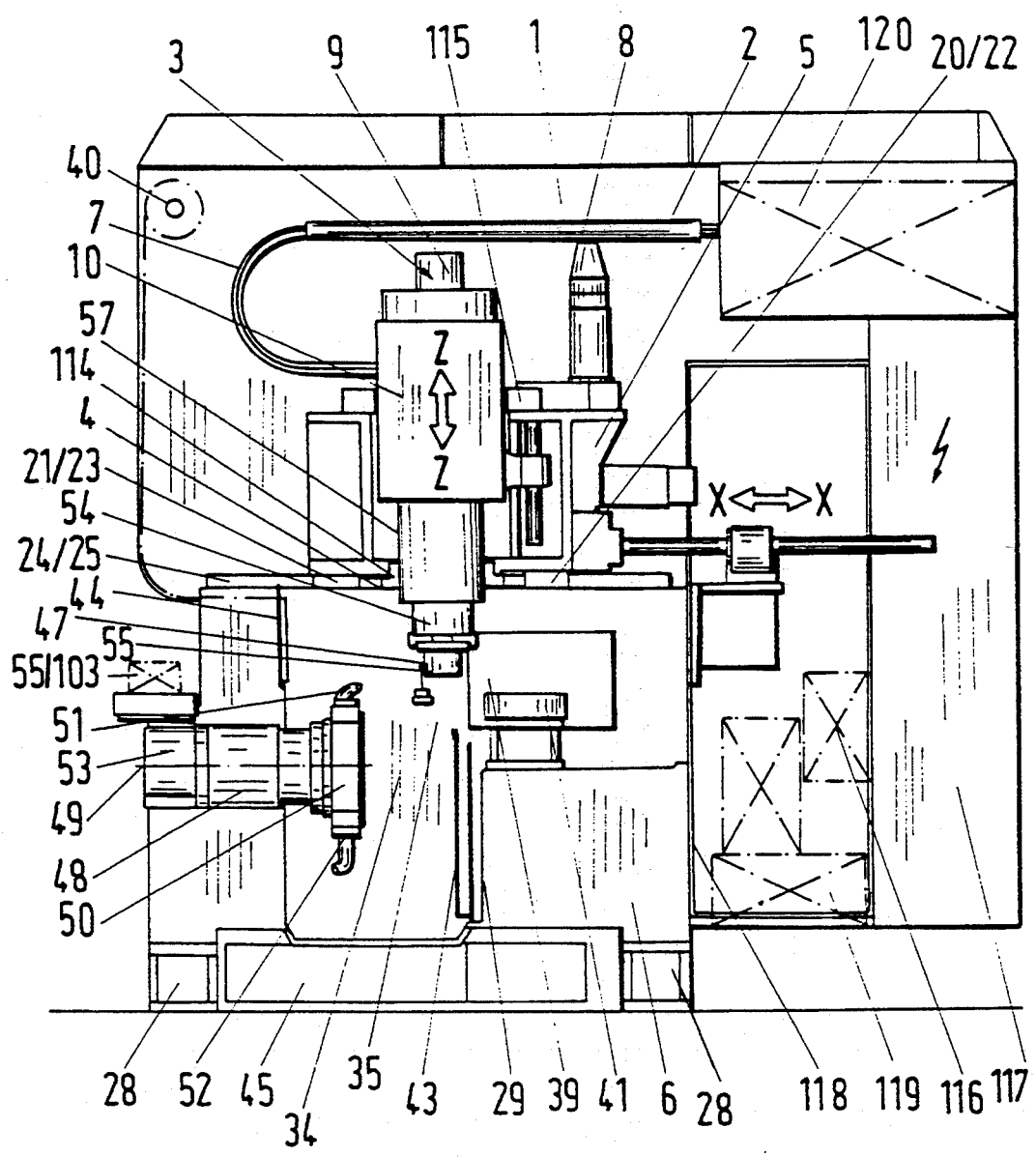
FIG. 33 is a schematic view of a measurement of a workpiece of the machining center of FIGS. 30 and 31, wherein the probe is swiveled into a working area.
Figure 34:
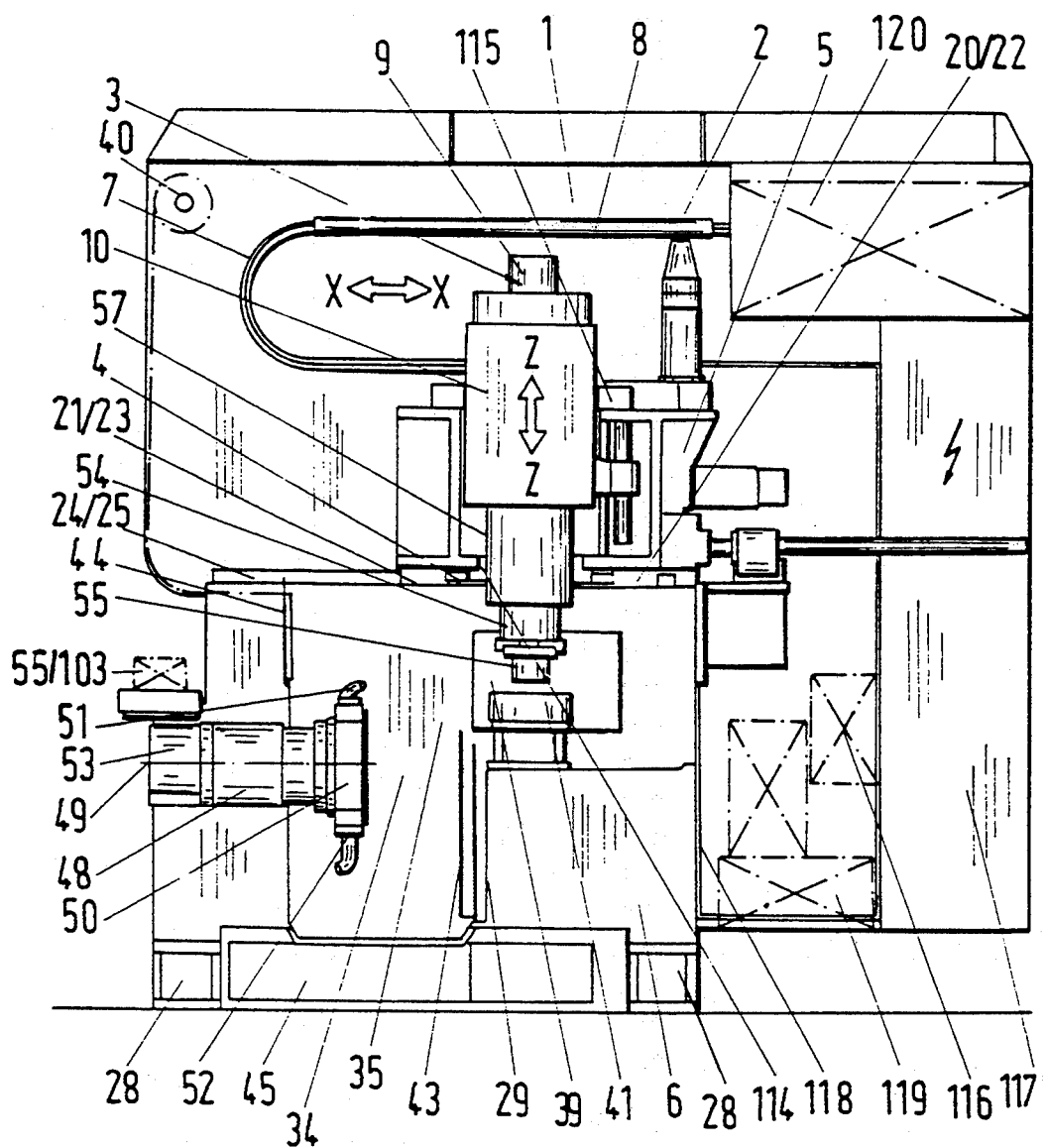
FIG. 34 is a schematic view of a machine constructed in accordance with the present invention depositing a machined workpiece onto a storage and conveyor belt.

For measuring the workpieces 55, a probe 47 is swiveled into the working area 34 after the door 43 is opened (FIGS. 32, 33). The measuring zone 35 is no longer located separately from the working area as in the above described examples, but is located both in the working area 34 as well as in the loading and unloading zone 39 (FIGS. 32, 33).

Between the machine structure 6 and the control cabinet 117 sufficient space is available within the machining center for installation of the hydraulic power pack 119, the central lubricating unit 116 as well as the heat exchanger 121. This area is accessible through the doors 118.

The machining center is transported complete as one unit and, commissioning by the customer can thus be carried out in a comparatively short period of time.

While we have shown and described several embodiments in accordance with the present invention, it is understood that the same is not limited thereto but is susceptible to numerous changes and modifications as known to one of ordinary skill in the art, and we therefore do not wish to be limited to the details shown and described herein, but intend to cover all such modifications as are encompassed by the scope of the appended claims.

We claim:

1. A machining center composed of a plurality of assemblies, each of said assemblies including a machine base, each machine base includes a compound slide, guides for guiding a movement of the compound slide with respect to the machine base, a motor including a motor spindle driven by said motor, said motor spindle is attached to the compound slide and is movable along a plurality of axes, facilities for enabling a collection of swarf and coolant, a housing attached to the machine base, wherein said housing is formed by a container, adapted to be mounted on the machine base as a module, for housing at least control elements and a power supply, first openings are provided between the guides of the compound slide and the motor spindle and the compound slide for enabling removal of the swarf, further openings are provided in the machine structure for accommodating a storage and transportation unit, a probe is incorporated in a machine control for enabling a checking of machined workpieces, and wherein a sheet metal cover is fastened to said compound slide and includes a vertically extending hole therein for enabling penetration of said motor spindle through said sheet metal cover in a sealed manner.

2. A machining center according to claim 1, wherein, in an area between the machine structure and a control cabinet, a hydraulic power pack, a central lubricating unit and a heat exchanger are disposed, and wherein at least one lockable door is provided in said area.

3. A machining center according to claim 1, wherein a shaped cast-in metal sheet is provided for protecting at least some of said openings.

4. A machining center according to one of claims 1 or 3, wherein the machine base encloses a working area on three upright vertical sides and from below.

5. A machining center according to one of claims 1 or 3, wherein the machine base is cast from a polymer concrete.

6. A machining center according to claim 1, wherein the machine base has an H-shape in an orthogonal longitudinal section to a longitudinal axis of the machine structure.

7. A machining center according to claim 1, wherein the machine base has an approximately U-shape in an orthogonal section to a longitudinal axis of the machine base.

8. A machining center according to claim 1, wherein the machine base has an approximately L-shape in an orthogonal section to a longitudinal axis of the machine base.

9. A machining center according to claim 1, wherein said guides are fashioned as parallel running guide rails, one of said guide rail is located on an upper side of one side wall of the machine base and another of said guide rails is located on another side wall.

10. A machining center according to claim 1, wherein the machine base is disposed on removable machine pedestals so as to provide an intermediate space between a bottom of the machine base and a supporting surface.

11. A machining center according to claim 1, wherein the machine base serves as a stationary unit for enabling a fitting of at least one of stationary tool boxes and stationary turrets.

12. A machining center according to claim 1, wherein a multifunctional lower machining unit is disposed in an area enclosed by the machine base.

13. A machining center according to claim 1, wherein a shaft of a multiple turret is located within an area enclosed by opposed spaced side walls of the machine base.

14. A machining center according to claim 1, wherein the multiple turret is a double turret with tool carriers.

15. A machining center according to claim 1, wherein the guides for the compound slide extend beyond a machining position so as to enable the compound slide to be guided to the storage and transportation unit.

16. A machining center according to claim 15, wherein the storage and transportation unit includes a conveyor belt.

17. A machining center according to claim 1, wherein the motor spindle and the compound slide form a headstock unit of a two axis construction, whereby the compound slide along an X-axis and the motor spindle are located in a CNC controlled traversable position along a Z-axis, and wherein the motor spindle is traversable via the storage and transportation unit.

18. A machining center according to claim 17, wherein the storage and transportation unit includes a conveyor belt.

19. A machining center according to claim 1, wherein the compound slide is driven by a rapid reaction frequency controlled maintenance-free three-phase motor for driving the compound slide through high precision ground recirculating ball screws, whereby an encapsulated linear measuring system is fitted along the X-axis and a rotating measuring system along the Z-axis, with both the linear and rotating measuring systems being located outside of the working area.

20. A machining center according to claim 1, wherein the container is fashioned as a self-supporting sheet metal construction.

21. A machining center according to claim 1, wherein the container at least partly encloses the machine base.

22. A machining center according to claim 1, wherein the container completely encloses the machine base from above and over at least three sides.

23. A machining center according to claim 1, wherein the container houses a completely installed control cabinet with projecting preassembled plug connections to consumers.

24. A machining center according to claim 23, wherein the plug connections also include electrical cables installed in racks, said racks are linked with the container, and wherein the electrical cables are installed in loops so as to enable an unhindered movement of at least one of the compound slide and the main spindle.

25. A machining center according to one of claims 22 or 23, wherein the container further accommodates a cooling unit for the motor spindle and control cabinet cooling, and wherein hydraulic lines, air supply lines, and coolant lines are laid in loops to the consumers and are also installed in racks.

26. A machining center according to claim 1, wherein a loading and unloading zone, a working area and a measuring area are located in sequence in an X-direction, and wherein the working area is separated by a door adapted to be opened and closed in response to the machine control.

27. A machining center according to claim 1, further comprising:
means for griping and clamping a workpiece as a blank and depositing a finished workpiece in a loading and unloading zone of the storage and transportation unit; and
means for enabling an automatic exchange of worn tools from indexing tool mounting devices provided on the storage and transportation unit by a tool gripper on an upper machining unit.

28. A machining center according to claim 1, wherein the machining center is used for construction of a two-axis multifunctioning machining system for machining of workpieces along two axes, said compound slide is a multifunctional compound slide, wherein means are provided for gripping and clamping a blank and depositing a finished workpiece in a loading and unloading zone of the storage and transportation unit; means are provided for enabling a carrying out of a centrical machining process; means are provided for enabling automatic exchange of worn tools from indexing tool mounting devices provided on the storage and transportation unit including a tool gripper on an upper machining unit; wherein the centrical machining processes include turning, grinding, and drilling and partly non-cutting machining, including planishing, rolling and calibrating.

29. A machining center for an assembly of a three-axis multifunctional system according to claim 1, said machining system being adapted to machine workpieces along two-axes, wherein means are provided for gripping and clamping of a blank and depositing of a finished workpiece in a loading and unloading zone of the storage and transportation unit; means are provided for enabling a centrical machining process; means are provided for enabling an automatic exchange of worn tools from indexing tool mounting devices on the storage and transportation unit by a tool gripper on an upper machining unit; wherein the centrical machining processes include turning, grinding, and drilling and partly non-cutting machining, including planishing, rolling and calibrating.

30. A machining center for an assembly of a four-axis multifunctional machining system according to claim 1, wherein the machine structure machines workpieces along three-axes; means are provided for gripping and clamping of a blank and depositing of a finished workpiece in a loading and unloading zone of the storage and transportation unit; means are provided for enabling a five-side machining for all possible metal removing and partly for non-cutting machining process; means are provided for enabling an automatic exchange of worn tools from indexing tool mounting devices on the storage and transportation unit by a tool gripper on an upper machining unit; wherein the non-cutting machining processes include planishing, rolling, calibrating and laser welding.

31. A machining center for an assembly of a six-axis multifunctional machining system according to claim 1, wherein the machining system serves to complete machine a workpiece in two settings along three-axis, said main spindle has a C-axis and a lower multifunctional machining unit with an E-axis is provided swiveling a motor spindle with a F-axis; wherein means are provided for gripping and clamping of a blank and depositing a finished workpiece in a loading and unloading zone with a clamping device on the motor spindle; means are provided for enabling a five-sided machining in all angular positions for all possible metal removing and for non-cutting machining processes including planishing, rolling, calibrating and laser welding; means are provided for enabling a removal of tools by a tool gripper fastened on an upper machining unit from the motor spindle and transferring the removed tools to a storage belt forming a tool magazine; means are provided for removing a safety cap from a clamping device of a lower machining unit by the tool gripper of the upper machining unit and transferring the safety cap to the storage belt; means are provided for clamping the semi-finished workpiece in the clamping device of the lower machining unit; means are provided for covering the upper clamping device by directly receiving the safety cap from the storage belt; means are provided for changing machining tools in the motor spindle directly from the storage belt in the loading and unloading zone and redepositing the tools in the loading and unloading zone; means are provided for machining still unmachined workpiece surfaces for a workpiece clamped in the lower motor spindle; and wherein means are provided for removing a finished workpiece from the lower machining unit and transferring the workpiece to the storage belt.

32. A machining center for an assembly of a seven-axis multifunctional machining system, said machining system being adapted to completely machine a workpiece in two settings with a four-axis multifunctional compound slide having a D-axis, a spindle unit with a C-axis and a lower multifunctional machining unit with an E-axis for swiveling, and a spindle unit with a F-axis, wherein means are provided for gripping and clamping of a blank and depositing a finished workpiece in a loading and unloading zone including a clamping device on an upper machining unit; means are provided for enabling a five-sided machining in all angular positions for all possible metal removing and for non-cutting machining processes including planishing, rolling, calibrating and laser welding; means are provided for enabling a measurement of workpieces including a probe located on the machine structure; means are provided for enabling a removal of tools by a tool gripper fastened on the upper machining unit from a lower motor spindle and transferring the removed tools to a storage belt; means are provided for measuring the exchanged lower tools including a probe located at the upper compound slide, that is adjustable in the working area; means are provided for enabling a removal of a safety cap from a clamping device of a lower machining unit by a tool gripper of the upper machining unit and transferring the safety cap to the storage belt; means are provided for enabling a reclamping of a semi-finished workpiece in the clamping device of the lower machining unit; means are provided for covering the upper clamping device by directly receiving the safety cap from the storage belt; means are provided for enabling a changing of machining tools in the spindle unit directly from the storage belt in the loading and unloading zone and redepositing the tools at the loading and unloading zone; means are provided for enabling a measurement of tools exchanged in the lower motor spindle including a probe located on the machine structure; means are provided for machining still unmachined workpiece surfaces for the workpiece clamped in the lower motor spindle; means are provided for measuring components that are clamped in the lower motor spindle including a probe located on the compound slide, adjustable in the working area; and wherein means are provided for enabling a removal a finished workpiece from the lower machining unit and transferring the finished workpiece to the storage belt constructed as a storage and transportation unit.

33. A machining center according to one of claims 28, 29, 30 or 31 wherein the storage and transportation unit includes a conveyor belt.

34. A machining center according to claim 1, wherein bearings of the motor spindle are cooled to a constant temperature.

35. A machining center according to claim 1, wherein the compound slide is a three-axis compound slide and bearing means including a slide valve.

36. A machining center according to claim 1, wherein a lower multifunctional machining unit is provided, said lower multifunctional machining unit including several fixed tools; an off-center mounted motor spindle, means for enabling the lower multifunctioning machining unit to be swiveled by a CNC control whereby the motor spindle of said lower multifunctional machining unit, having a swivel axis, is adapted to operate in every required angle; means are provided for driving the motor spindle in an infinitely variable manner including a fitted or external AC motor; said motor spindle of said lower multifunctional unit includes a workpiece and tool clamping device for enabling an alternate mounting of tools and workpieces; and wherein the motor spindle of said lower multifunctional unit has a CNC controlled axis.

37. A machining center according to claim 1, wherein the storage and transportation unit are equipped with angular drives for accommodating workpieces and tools.

38. A machining center according to claim 1, wherein a safety housing of an aluminum lamina, shaped as a roller blind covers a front area of the machine structure.

39. A machining center according to claim 1, wherein the compound slide is a multiple axis multifunctional compound slide cooperable with said motor spindle and having a U-axis in a CNC facing head for enabling adjustment of tools, whereby a gripping, clamping and depositing of a workpiece from an indexing belt by a clamping device is carried out thereby enabling central machining processes including contour turning, internal cutting and face turning.

40. A machining center according to claim 1, wherein the motor spindle is centrally located in the compound slide.

41. A machining center according to claim 1, wherein the motor spindle is vertically movably mounted in a hydrostatic guide.

42. A machining center according to one of claims 40 or 41, wherein a loading and unloading zone of the machine structure is located behind a working area inside the machining center.

43. A machining center according to claim 42, wherein the storage and conveyor unit is passed through the openings in the back of the machine structure in the loading and unloading zone through the machining center.

44. A machining center according to claim 1, further comprising means for automatically swivelling the probe into a working area after a door of the machining center is opened.

45. A machining center according to claim 1, wherein a measuring zone is provided and is disposed partly in a working area and in a loading and unloading zone of the machining center.

46. A machining center according to claim 2, wherein the container has a L-shape configuration in a side view wherein electrical, hydraulic and/or air supply lines required for operating the machine structure are preassembled and includes plug connections disposed in a horizontally arranged portion of the L-shape and the control cabinet, the hydraulic power pack, central lubricating unit and heat exchanger are located in a vertically associated arm portion of the L-shape, and wherein a horizontal portion of the L-shape covers the machine base from above with a part of the associated vertical portion of the L-shape forming a portion of one front wall for the machine base.

47. A machining center according to any one of claims 27 to 29, further comprising a tool post.

48. A machining center according to claim 47, wherein said tool post is provided with a fixed tool.

49. A machining center according to claim 47, wherein said tool post is provided with a rotating tool.

50. A machining center according to any one of claims 27 to 29, further comprising a multiple rotary tool turret.

51. A machining center according to claim 50, wherein said multiple rotary tool turret is provided with at least one of fixed and rotating tools.

52. A machining center according to claim 30, further comprising a transverse double turret.

53. A machining center according to claim 52, wherein said transverse double turret is provided with at least one of fixed and rotating tools.

54. A machining center according to claim 30, further comprising a multiple tool mounting beam.

* * * * *